United States Patent [19]
Sawada et al.

[11] Patent Number: 5,513,946
[45] Date of Patent: May 7, 1996

[54] CLEAN ROBOT

[75] Inventors: Yasuhiro Sawada, Chofu; Yusaku Azuma, Yokohama; Masateru Yasuhara, Kawasaki, all of Japan

[73] Assignee: Canon Kabushiki Kaisha, Tokyo, Japan

[21] Appl. No.: 321,922

[22] Filed: Oct. 12, 1994

Related U.S. Application Data

[62] Division of Ser. No. 935,417, Aug. 26, 1992, abandoned.

[30] Foreign Application Priority Data

| Aug. 27, 1991 | [JP] | Japan | 3-215397 |
| Aug. 27, 1991 | [JP] | Japan | 3-215398 |
| Aug. 27, 1991 | [JP] | Japan | 3-215399 |
| Apr. 30, 1992 | [JP] | Japan | 4-111045 |

[51] Int. Cl.$^6$ ............ B25J 18/00
[52] U.S. Cl. ............ 414/744.5; 901/15; 901/21; 901/28
[58] Field of Search ............ 414/744.5; 901/15, 901/21, 28; 74/490.04, 490.05

[56] References Cited

U.S. PATENT DOCUMENTS

| 3,285,081 | 11/1966 | Kuhns et al. | 74/89.22 |
| 4,392,776 | 7/1983 | Shum | 414/744.5 |
| 4,706,515 | 11/1987 | Yasukawa | 74/479 BF |
| 4,903,539 | 2/1990 | Toyoda et al. | 74/479 BF |
| 4,984,745 | 1/1991 | Akeel et al. | 901/15 X |
| 5,007,784 | 4/1991 | Genov et al. | 414/744.5 X |
| 5,031,474 | 7/1991 | Keppler et al. | 901/15 X |

FOREIGN PATENT DOCUMENTS

| 61-182787 | 8/1986 | Japan . | |
| 1140738 | 6/1989 | Japan . | |
| 316184 | 12/1989 | Japan | 414/744.5 |
| 283182 | 3/1990 | Japan . | |
| 282550 | 3/1990 | Japan . | |
| 347834 | 10/1991 | Japan . | |

*Primary Examiner*—Donald W. Underwood
*Attorney, Agent, or Firm*—Fitzpatrick, Cella, Harper & Scinto

[57] ABSTRACT

A clean robot capable of a linear conveying motion comprises a base, a first arm rotatably supported by the base, a second arm rotatably supported by the first arm, and a third arm rotatably supported by the second arm. Also provided are a first driving unit for rotating the first arm with respect to the base in a first rotational direction at a first angular velocity, a second driving unit for rotating the second arm with respect to the first arm in a second rotational direction reverse to the first rotational direction at a doubled angular velocity of the first angular velocity, and a third driving unit for rotating the third arm with respect to the second arm in the first rotational direction at the first angular velocity.

3 Claims, 23 Drawing Sheets

REDUCTION RATIO OF FIRST ARM DRIVING PORTION

| FIRST AND SECOND PULLEYS | FIRST REDUCTION UNIT | THIRD AND FOURTH PULLEYS | WHOLE REDUCTION RATIO |
|---|---|---|---|
| 1/1 | 1/100 | 1/2 | 1/200 |
| 1/2 | 1/50 | 1/2 | 1/200 |
| 1/1.6 ← EMBODIMENT | 1/50 | 1/2.5 | 1/200 |
| ⋮ | ⋮ | ⋮ | ⋮ 1/200 |

FIG. 27A

REDUCTION RATIO OF SECOND ARM DRIVING PORTION

| SECOND REDUCTION UNIT | FIFTH AND SIXTH PULLEYS | WHOLE REDUCTION RATIO |
|---|---|---|
| 1/100 ← EMBODIMENT | 1/1 | 1/100 |
| 1/50 | 1/2 | 1/100 |
| ⋮ | ⋮ | ⋮ 1/100 |

FIG. 27B

CLEAN ROBOT

This application is a division of application Ser. No. 07/935,417, filed Aug. 26, 1992, now abandoned.

BACKGROUND OF THE INVENTION

The present invention relates to a clean robot which conveys wafers, reticles and the like in a clean room.

Semiconductor manufacturing apparatuses employ robots for clamping and conveying a wafer or a reticle out of a cassette, or conversely, putting them into the cassette. These robots work in a clean room.

In the clean robots, some arrangement to keep dust away from a driving transmission system within the robot body is necessary. Conventionally, the robots have comprised exhaust means for forcibly exhausting air in a casing to the outside of the clean room, as disclosed in Japanese Utility Model Publication No. 3-47834, or a magnetic fluid seal for completely sealing rotating portions as disclosed in Japanese Patent Laid-open No. 61-182787.

The exhaust means necessitates an exhaust unit for forcibly exhausting the air in the casing, which causes problems of cost and space. The magnetic fluid seal is advantageous because it does not need the forcible exhausting means. However, the fluid should be introduced around the rotating portions upon assembling and adjusting the robot. Otherwise, it should be introduced after the assembling and adjustment of the robot, i.e., the robot should be disassembled for introducing the fluid, and again assembled and adjusted. In the former setting, if the assembling adjustment process fails, the expensive magnetic fluid seal is wasted. Even though the fluid is used in the next assembling, its sealing capability is lowered since it may include dust raised in the previous assembling adjustment process. In the latter setting, the assembling and adjustment of the robot after setting of the seal increases the cost.

Another problem may arise when a sensor for detecting wafers or reticles is attached to the exterior of the robot a wiring member is introduced into the casing of the robot. In this case, dust must be prevented from the wire-introduced portion of the casing by sealing. Conventionally, the casing is holed for introducing the wiring member or a connector. After the wiring member or the connector is set, a sealing member is attached around the wiring member or the connector. Since the sealing member is attached with parts such as screws, the drawback arises that the number of parts for assembling the robot increases.

These robots conveying wafers or reticles are required to make "a linear conveying motion" in order to avoid breakage of the wafers or reticles. Conventional robots have realized this linear conveying motion by employing a timing belt as disclosed in Japanese Patent Laid-open No. 2-82550 and Japanese Patent Laid-open No. 2-83182, and a link mechanism as disclosed in Japanese Patent Laid-open No. 1-140738. Further, a robot having a motor and a reduction gear on its arm to control the movement as disclosed in Japanese Patent Application No. 3-215397 is known.

However, in the robots in Japanese Patent Laid-open Nos. 2-82550, 2-83182 and 1-140738, a transmission mechanism becomes complicated and it raises the cost. In the robot in Japanese Patent Application No. 3- 215397, the motor for driving the second arm projects under the second arm, which is inconvenient when the robot is used in a limited working space such as in a semiconductor manufacturing apparatus.

SUMMARY OF THE INVENTION

The present invention has been made in consideration of the above situation, and has as its object to provide a clean robot which is capable of a linear conveying motion with a simple mechanism, and which is also capable of lowering the cost.

It is another object of the present invention to provide a clean robot capable of containing pipes and signal lines necessary for the motion of the robot inside.

Further it is an object of the present invention to provide a clean robot which can be assembled and adjusted without wasting a magnetic fluid seal or lowering the sealing capability, and which requires no additional assembling and adjustment.

Still it is an object of the present invention to provide a clean robot in the exterior of which a sensor can be arranged without increasing the number of attaching parts of a connector of the sensor.

According to a first aspect of the present invention, the foregoing object is attained by providing a clean robot comprising:

a base;

a first arm supported rotatably within a first surface by the base on a first point as a supporting point;

a second arm supported rotatably within a second surface parallel to the first surface by the first arm on a second point as a supporting point at a predetermined distance from the first point;

a third arm supported rotatably within a third surface parallel to the first surface by the second arm on a third point as a supporting point at a predetermined distance from the second point;

first driving means, arranged in the base, for rotating the first arm with respect to the base around the first point in a first rotational direction at a first angular velocity;

second driving means, arranged in the first arm, for rotating the second arm with respect to the first arm around the second point in a second rotational direction reverse to the first rotational direction at a second angular velocity which is a doubled velocity of the first angular velocity; and third driving means for rotating the third arm with respect to the second arm around the third point in the first rotational direction at the first angular velocity.

According to a second aspect of the present invention, the foregoing object is attained by providing a clean robot comprising:

a base having a cylindrical main body at least one end of which is opened, and a plate-like cover which is arranged so as to seal the one end of the main body and which has a first opening hole formed at about the central portion of the cover;

a second opening hole formed around the first opening hole, through which at least a signal line is led out from the main body;

first driving means which is arranged in the main body and which has a first rotating shaft projecting from the first opening hole toward the outside of the base as an output shaft;

a hollow first arm, which has a third opening hole at one end portion thereof and a cylindrical projecting portion having a fourth opening hole at a projecting end portion thereof at the other end portion of the first arm, and which is fixed by the first rotating shaft at the one end portion rotatably around the first rotating shaft in a state where the one end portion of the main body is inserted into the third opening hole;

second driving means which is arranged in the cylindrical projecting portion and which has a second rotating shaft projecting through the fourth opening hole toward the outside of the first arm as an output shaft;

a hollow second arm which has a fifth opening hole at one end portion thereof, into which the projecting end portion of the cylindrical projecting portion is inserted, and which is fixed by the second rotating shaft at the one end portion rotatably around the second rotating shaft;

a third arm which is rotatably supported by the other end portion of the second arm; and third driving means arranged in the second arm, for rotating the third arm, wherein the signal line is introduced from inside of the base into the first arm through the second opening hole and is connected to said second driving means.

According to a third aspect of the present invention, the foregoing object is attained by providing a clean robot comprising:

a base having a cylindrical main body at least one end of which is opened, and a plate-like cover which is arranged so as to seal one end of the main body and which has a first opening hole formed at about the central portion of the cover;

a second opening hole formed around the first opening hole, through which at least a signal line is led out from the main body;

first driving means which is arranged in the main body and which has a first rotating shaft projecting from the first opening hole toward the outside of the base as an output shaft;

a hollow first arm, which has a third opening hole at one end portion thereof and a cylindrical projecting portion having a fourth opening hole at its projecting end portion at the other end portion of the first arm, and which is fixed by the first rotating shaft at the one end portion rotatably around the first rotating shaft in a state where the one portion of the main body is inserted into the third opening hole;

second driving means which is arranged in the cylindrical projecting portion and which has a second rotating shaft projecting from the fourth opening hole toward the outside of the first arm as an output shaft;

a hollow second arm which has a fifth opening hole at one end portion thereof, into which the projecting end portion is inserted, and which is fixed by the second rotating shaft at the one end portion rotatably around the second rotating shaft;

a third arm which is rotatably supported by the other end portion of the second arm;

clamping means which is arranged on the third arm and is driven by fluid; and a fluid channel through which fluid for driving said clamping means flows, supplied into the first arm through the second opening hole from inside of the base, and supplied into the second arm through the sixth opening hole formed in the second rotating shaft along an extending direction of the second rotating shaft.

According to a fourth aspect of the present invention, the foregoing object is attained by providing a clean robot comprising:

a first hollow member having a first opening hole;

a rotating shaft supported rotatably with respect to the first hollow member in a state where one end portion of the rotating shaft is inserted into the first hollow member through the first opening hole;

a second hollow member, fixed to the other end portion of the rotating shaft, having a second opening hole through which a magnetic fluid for sealing a gap between the first opening hole and the rotating shaft is supplied; and a covering body for, after the magnetic fluid is supplied to the gap between the first opening hole and the rotating shaft, sealing the second opening hole.

According to a fifth aspect of the present invention, the foregoing object is attained by providing a clean robot having inner mechanical members sealed with respect to the outside, comprising:

a sensor arranged outside of the main body of the robot;

an opening hole through which an electric wiring member of the sensor is introduced;

a connector fitted into the opening hole, for connecting the electric wiring member; and a sensor attaching member for holding the sensor and for sealing a gap between the outer circumference of the connector and the inner circumference of the opening hole.

According to a sixth aspect of the present invention, the foregoing object is attained by providing a clean robot comprising:

a hollow base;

a hollow first arm supported rotatably within a first surface by the base at a first point as a supporting point;

a hollow second arm supported rotatably within a second surface parallel to the first surface by the first arm at a second point as a supporting point at a predetermined distance from the first point;

a third arm supported rotatably within a third surface parallel to the second surface by the second arm on a third point as a supporting point at a predetermined distance from the second point;

first driving means, arranged in the base, for rotating the first arm with respect to the base around the first point in a first rotational direction at a first angular velocity;

second driving means, arranged in the first arm, for rotating the second arm with respect to the first arm around the second point in a second rotational direction reverse to the first rotational direction at a second angular velocity which is a doubled velocity of the first angular velocity;

third driving means for rotating the third arm with respect to the second arm around the third point in the first rotational direction at the first angular velocity; and a sealing member for, after said first driving means is arranged within the first arm and said second driving means and said third driving means are arranged within the second arm, sealing the base, the first arm and the second arm.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 27A and 27B show combinations of reduction ratios;

DETAILED DESCRIPTION OF THE PREFERRED EMBODIMENTS

Preferred embodiments of the present invention will be described in detail in accordance with the accompanying drawings.

FIRST EMBODIMENT

A structure of a clean robot according to a first embodiment of the present invention will be described with reference to FIG. 1 which is a sectional view of a robot 10.

Figure 1:
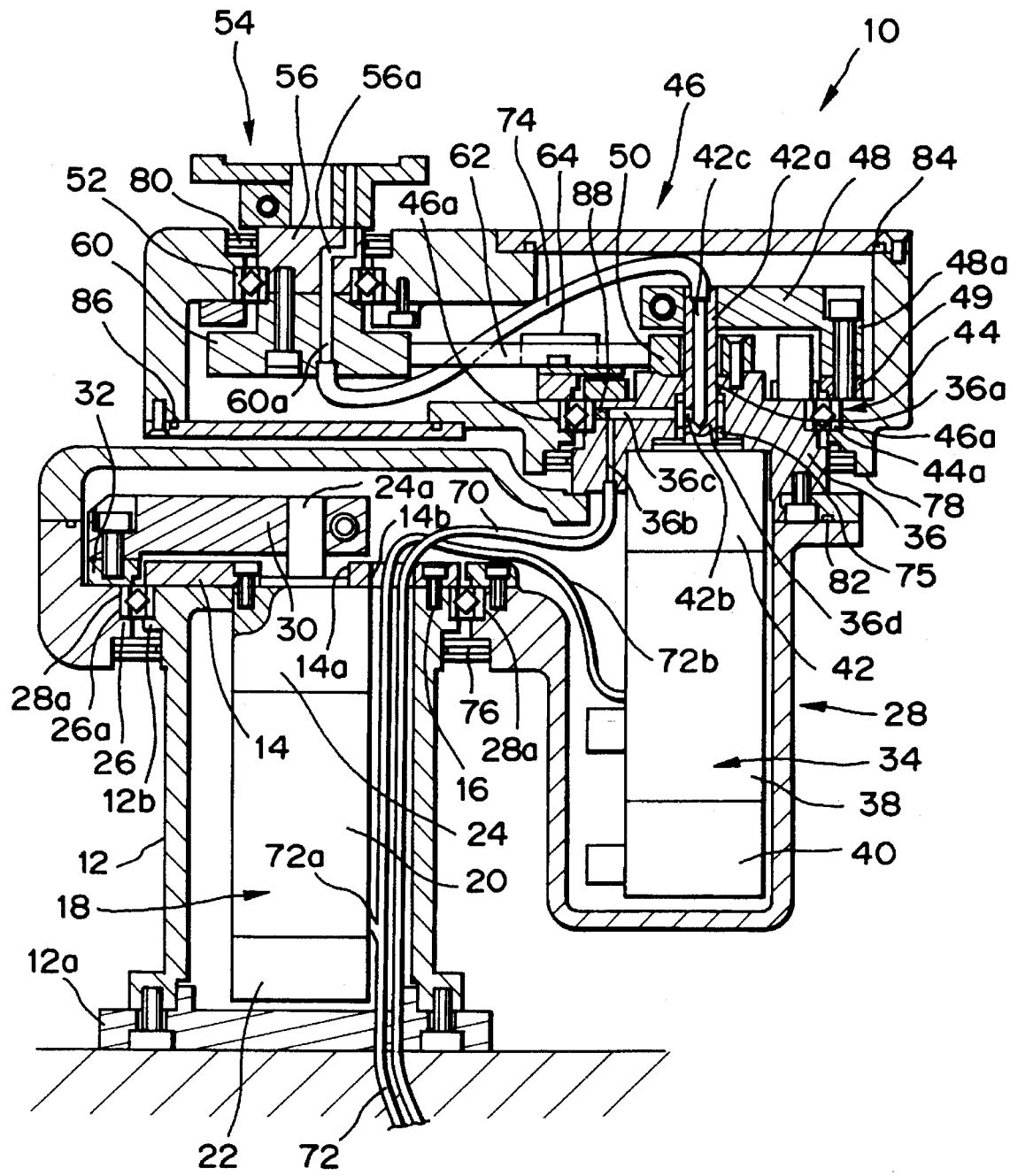
FIG. 1 is a sectional view showing a structure of a conveying robot according to a first embodiment.

In FIG. 1, a substantially cylindrical robot base has a flange 12a at the lower end portion of its outer circumferential surface. The flange 12a is fixed on a floor of a factory or a platform on the floor by bolts or the like, thus the robot 10 is fixed on the platform or the floor. On the upper end face of the robot base 12, a motor fixing plate 14 is fixed by a bolt 16 in a manner that it seals the upper end portion of the robot base 12. On the lower face of the central portion of the motor fixing plate 14, a first arm driver 18 is fixed. The first arm driver 18 comprises a first motor 20 which generates a driving force for driving a first arm 28 to be described later, a first rotary encoder 22 connected to the lower end of the first motor 20 and a first reduction unit 24 which is fixed on the upper end of the first motor 20 and which has an array of inner reduction gears connected to an output shaft of the first motor 20. The upper end face of the first reduction unit 24 is fixed to the lower surface of the motor fixing plate 14, and an output shaft 24a of the first reduction unit 24 projects above the motor fixing plate 14 through a hole 14a in the motor fixing plate 14.

On the other hand, at the upper end portion of the outer circumferential surface of the robot base 12, a flange 12b is formed to which a first bearing 26 is attached coaxially with the first reduction unit 24. The bearing 26 has an outer ring 26a with which an engaging portion 28a formed at one end portion of the first arm 28 engages. The first arm 28 which extends in a horizontal direction is attached to the outer ring 26a in this manner. More specifically, the first arm 28 is rotatably supported within a horizontal surface with respect to the robot base 12 around the rotational axis of the first bearing 26, i.e., the output shaft 24a of the first reduction unit 24. Further, a first transmission lever 30 for transmitting the driving force generated by the first motor 20 to the first arm 28 is fixed to the output shaft 24a of the first reduction unit 24. The end portion of the transmission lever 30 is fixed to the first arm 28 via a disklike connecting member 32. The first arm 28 is driven to rotate by the first motor 20 within a horizontal surface around the output shaft 24a of the first reduction unit 24.

At the other end portion of the first arm 28, a second arm driver 34 having a similar structure to that of the first arm driver 18 is fixed via a substantially cylindrical joint member 36. More specifically, the joint member 36 having a sealed upper end is attached onto the upper surface of the end portion of the first arm 28. The second arm driver 34, fixed under the ceiling portion of the joint member 36, comprises a second motor 38 for driving the second arm 46 to be described later, a second rotary encoder 40 connected to the lower end portion of the second motor 38 and a second reduction unit 42 connected to the upper end portion of the second motor 38. The second reduction unit 42 as the upper structure of the second arm driver 34 has an output shaft 42a which projects above the joint member 36 through a hole 36a in the ceiling portion of the joint member 36.

On the other hand, a second bearing 44 is attached onto the outer circumference of the upper portion of the joint member 36, coaxially with the output shaft 42a of the second reduction unit 42. The second bearing 44 has an outer ring 44a with which an engaging portion 46a formed at one end portion of the second arm 46 engages. The second arm 46 which extends in a horizontal direction is attached to the outer ring 44a in this manner and the second arm 46 is rotatably supported around the rotational axis of the second bearing 44, i.e., around the output shaft 42a of the second reduction unit 42. Further, a second transmission lever 48 for transmitting a driving force generated by the second motor 38 to the second arm 46 is fixed to the output shaft 42a of the second reduction unit 42. The lower end portion of the second transmission lever 48a is fixed to the second arm 46 via a disklike connecting member 49. The second arm 46 is driven by the second motor 38 to rotate within a horizontal surface around the output shaft 42a of the second reduction unit 42.

On the upper end surface of the joint member 36, a small pulley 50 is fixed, and a large pulley 60 is fixed to a rotating shaft 56 of a third arm 54 to be described later. These two pulleys are coupled by a steel belt 62.

At the other end portion of the second arm 46, the rotating shaft 56, the upper end of which is fixed to the third arm 54 is rotatably supported via a third bearing 52. More specifically, the third arm 54, which extends in a direction perpendicular to the drawing surface of FIG. 1, is rotatably supported within a horizontal surface with respect to the second arm 46. Further, a hand 58 (FIG. 7) for clamping wafers and reticles is attached to the other end portion of the third arm 54. The hand 58 clamps the wafers and reticles by vacuum absorption.

On the other hand, the large pulley 60 is fixed to the lower end of the rotating shaft 56 of the third arm 54. By the rotation of this large pulley 60, the third arm 54 is driven to rotate with respect to the second arm 46. As described above, the steel belt 62 is stretched between the small pulley 50 fixed to the joint member 36 and the large pulley 60. At a substantially intermediate position between the pulleys, an idler 64 is arranged to adjust any slack in the belt.

The structure of a rotating mechanism of the third arm 54 comprising the small pulley 50, the large pulley 60, the steel belt 62 and the idler 64 will be described in detail with reference to FIGS. 2 to 6.

Figure 2:
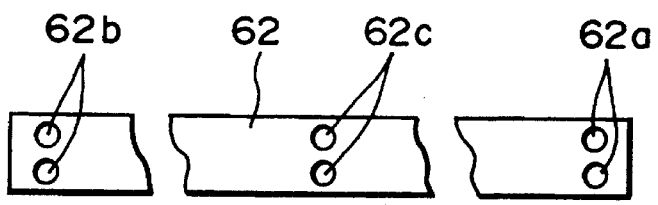
FIG. 2 illustrates a steel belt.

The steel belt 62 is thin an made of a publicly known stainless steel. The steel belt 62 can be formed into a loop or a band with its both end portions being punctuated. In this embodiment, the latter type of belt is employed. As shown in FIG. 2, a couple of holes 62a are formed at one end portion of the steel belt 62, the other couples 62b and 62c are formed respectively at the other end portion and a central portion of the steel belt 62.

Figure 3A:
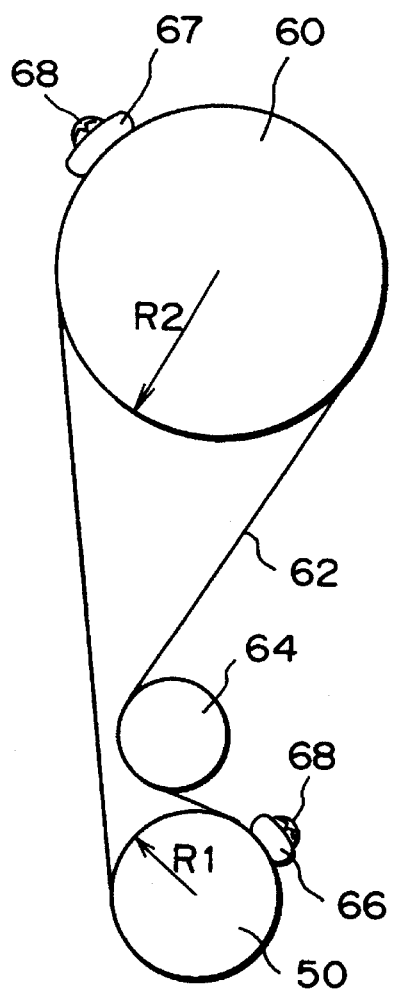
FIGS. 3A and 3B illustrate the steel belt wound around pulleys.
Figure 4A:
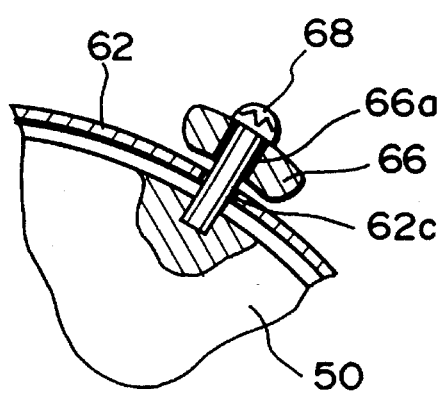
FIGS. 4A and 4B are sectional views showing how the belt is fixed to the pulleys.
Figure 4B:
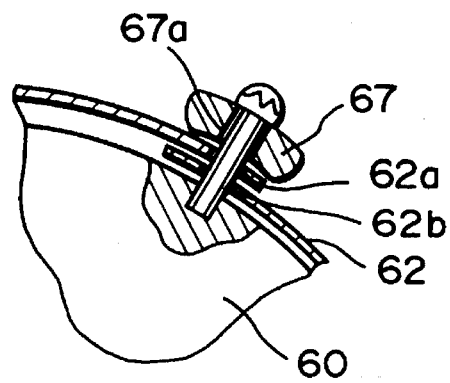

The steel belt 62 is wound around the small pulley 50, the large pulley 60 and the idler 64 as shown in FIG. 3A. As shown in FIGS. 4A and 4B, the steel belt is fixed to the pulleys with belt fixing plates 66 and 67, and fixing screws 68. As shown in FIG. 4A, on the small pulley 50, the fixing screws 68 are inserted through holes 66a (FIG. 5) of the fixing plate 66 and the holes 62c at about the center of the steel belt 62, to be engaged with screw holes of the small pulley 50, pressing the steel belt 62 against the small pulley 50. As shown in FIG. 4B, on the large pulley 60, the fixing screws 68 are inserted through the holes 62a and the holes 62b, i.e., through the holes of the both ends of the steel belt 62 placed on the pulley 60 one over another, to be engaged with screw holes of the large pulley 60, pressing the steel belt 62 against the large pulley 60.

Figure 5A:
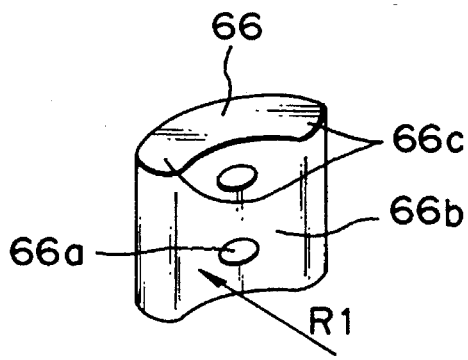
FIGS. 5A and 5B illustrate belt fixing pieces.
Figure 5B:
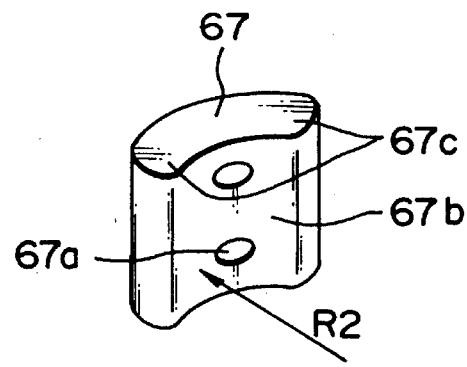
Figure 6:
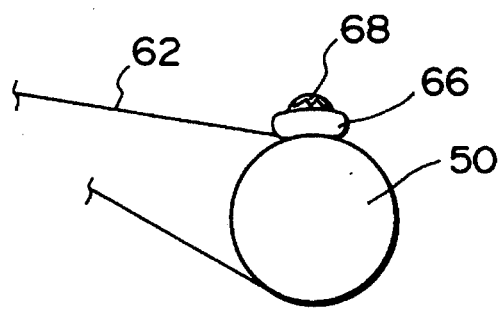
FIG. 6 illustrates the steel belt which is bent.

As shown in FIGS. 5A and 5B, inner faces 66a and 67a of the belt fixing plates 66 and 67 are curved to fit the round small pulley 50 and large pulley 60. As a result, the steel belt 62 is pressed with "surfaces". Compared with a case where only fixing screws are employed to press the belt, the above arrangement gives more strength (longer life) of the belt, because the fixing plates prevent stress concentration of the belt better than the fixing screws. Further, round chamfers 66c and 67c are formed at the both end portions of the inner faces 66b and 67b of the belt fixing plates 66 and 67 to protect the steel belt even if the respective pulleys rotate too much to bend the steel belt 62.

Figure 3B:
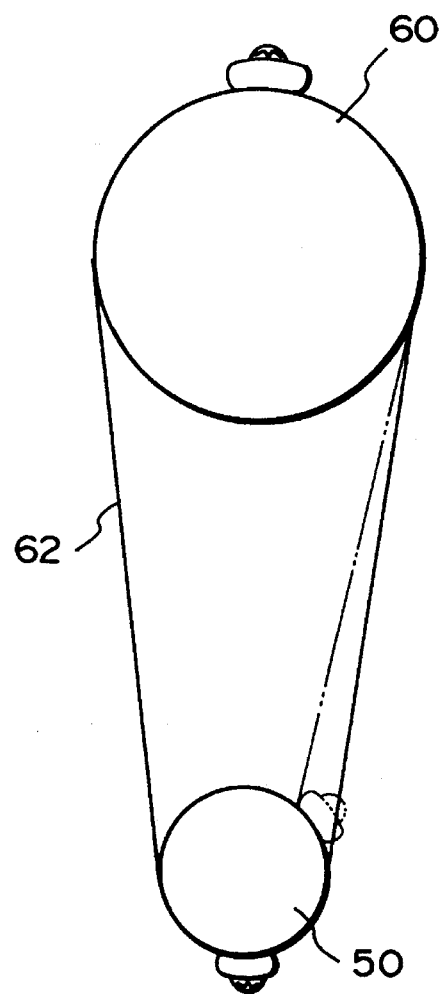

In this embodiment, distances between the shafts of the arms cannot be changed due to the structure of the robot 10, for this reason, the aforementioned idler 64 is arranged to adjust an slack in the belt. This idler 64 has an advantage that it enlarges the rotatable angle of the third arm 54. If the steel belt 62 is arranged around the respective pulleys as shown in FIG. 3B, angles over which the belt contacts with the pulleys are small. In this case, the steel belt 62 is bent as expressed by a two-dot dash line in FIG. 3 because of the small rotational capability of the respective pulleys. In contrast, if the idler 64 is arranged as shown in FIG. 3A, the contact angle of the steel belt 62 is large enough to enlarge the rotatable angle of the third arm 54.

Next, the principles of the motion of the robot 10 having the above structure will be described with reference to FIGS. 7A to 7C, FIGS. 8A and 8B and FIGS. 9A to 9C. Usually, a robot which conveys wafers and reticles has two motion patterns, i.e., a liner motion as shown in FIGS. 7A to 7C, and a rotational motion as shown in FIGS. 8A and 8B.

Figure 7C:
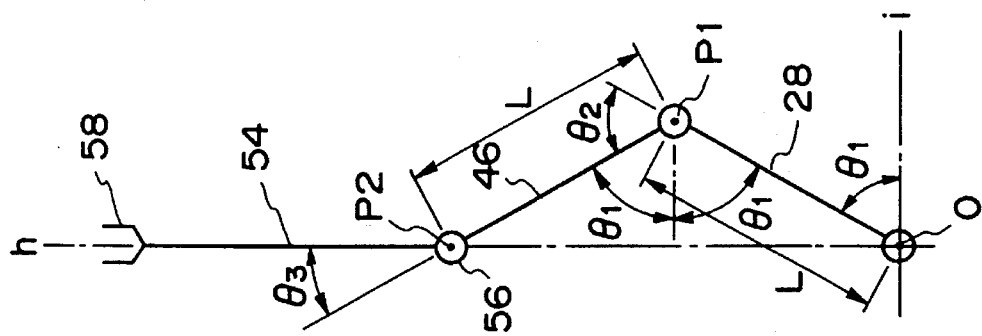
FIGS. 7A to 7C show a linear conveying motion of the conveying robot.
Figure 7B:
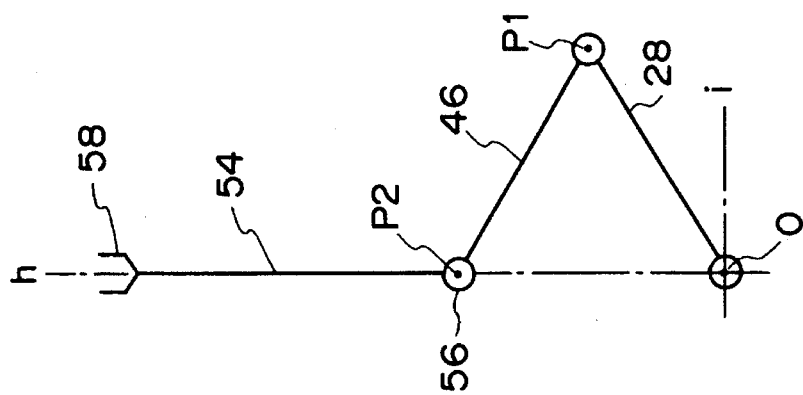
Figure 7A:
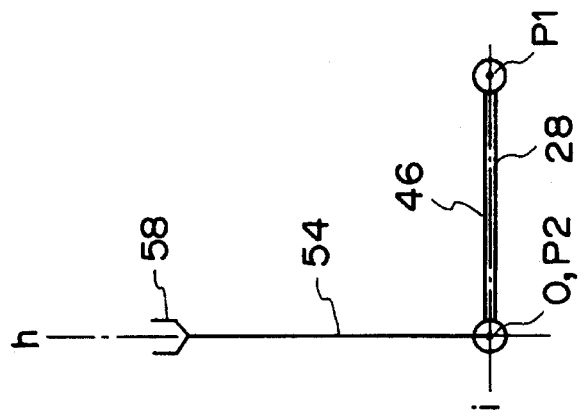
Figure 8B:
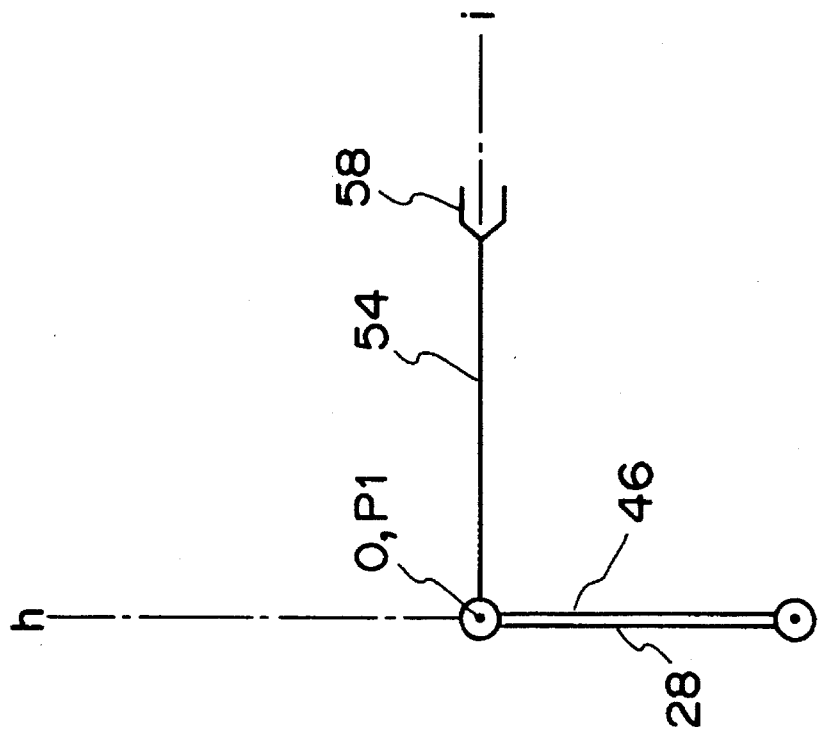
FIGS. 8A and 8B show a rotational motion of the conveying robot.
Figure 8A:
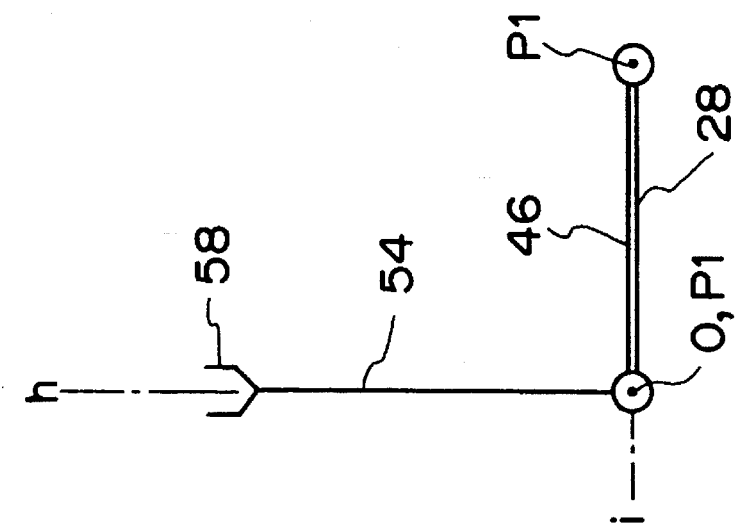

First, the motion of the hand 58 as shown in FIGS. 7A to 7C along a straight line h orthogonal to a reference straight line i will be described. It should be noted that the both first arm 28 and the second arm 46 have the same length L and that the rotational angels of the first arm 28, the second arm 46 and the third arm 54 are respectively $\theta_1$, $\theta_2$ and $\theta_3$. If the first arm 28, the second arm 46 and the third 54 are moved so that $\theta_1$, $\theta_2$ and $\theta_3$ are expressed by the following equations:

$$\theta_2 = 180° - 2\theta_1$$

$$\theta_3 = \theta_2/2$$

(where, $\theta_1 = 0°$ to $90°$, $\theta_2 = 180°$ to $0°$, $\theta_3 = 90°$ to $0°$) the end portion of the third arm 54, i.e., the hand 58 is moved straight along the straight line h as shown in FIGS. 7A to 7C.

In order to realize the above motion, the robot 10 employs two motors having similar characteristics as the first motor 20 and the second motor 38. The ratio of the reduction ratio of the first reduction unit 24 to that of the second reduction unit 42 is 2:1. Note that in this embodiment, the reduction ratio of the first reduction unit 24 is 1/100, and that of the second reduction unit 42 is 1/50. More specifically, in case where the first motor 20 and the second motor 38 are rotated in opposite directions at the same velocities, if the first arm 28 is rotated around the origin O in a counterclockwise direction by θ1 as shown in FIG. 7C, the second arm 46 is rotated around a point P1, i.e., the end portion of the first arm 28 in a clockwise direction by 2θ1. By these motions, a pivotal point P2 of the third arm 54, i.e., the rotating shaft 56 is moved straight along the straight line h.

The third arm 54 or the hand 58 can be moved along the straight line h by making the diameter of the small pulley 50 a half of that of the large pulley 60 to satisfy the θ3=θ2/2 relationship.

Figure 9C:
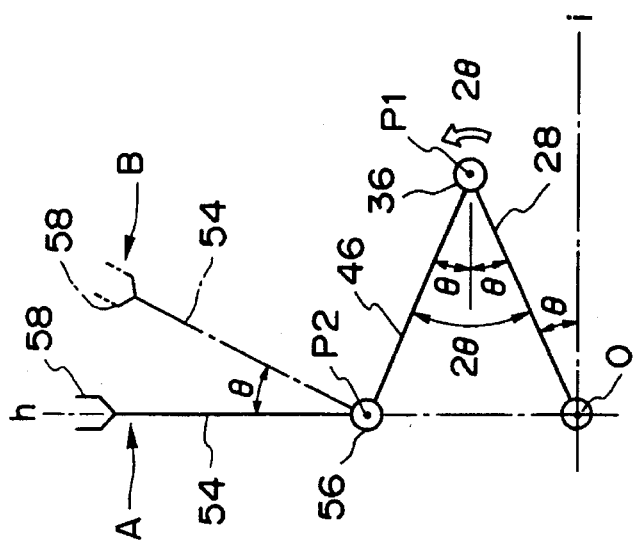
FIGS. 9A to 9C are diagrams for clearly explaining the liner conveying motion of the conveying robot.

The relationship in the motions of the first arm 28, the second arm 46 and the third arm 54 will be described in detail with reference to FIGS. 9A to 9C.

Figure 9B:
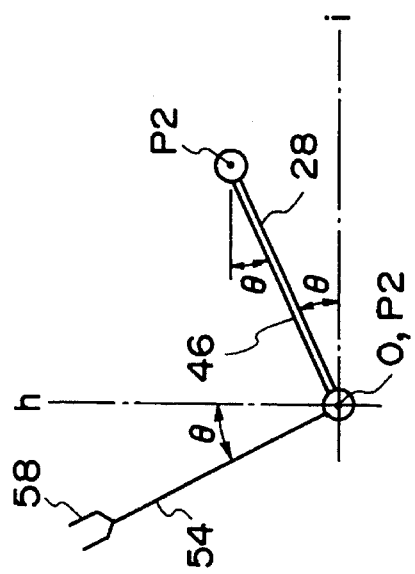
Figure 9A:
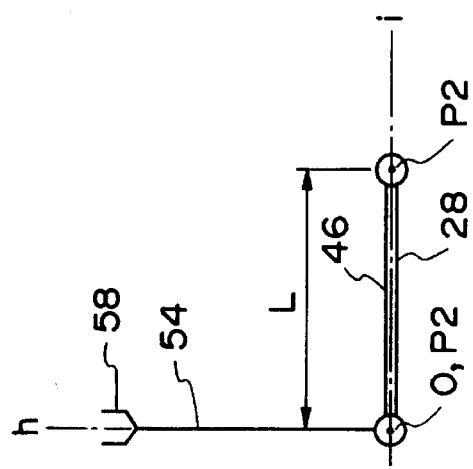

First, it is assumed that only the first motor 20 is started to rotate the first arm 28 in a counterclockwise direction by θ from the initial position as shown in FIG. 9A showing a similar initial status to that of FIG. 7A. The status of the robot 10 at this time is as shown in FIG. 9B. Next, only the second motor 38 is started to rotate the second arm 46 in a clockwise direction with respect to the first arm 28. As the length of the first arm 28 and that of the second arm 46 are the same, the end portion of the second arm 46, i.e., the point P2 is moved onto the straight line h as shown in FIG. 9C. It is understood from the above motions that the point P2, the end portion of the second arm 46, can be moved along the straight line h, simply by making the rotational direction of the second arm reverse to that of the first arm 28, and changing the rotational angle of the second arm 46 to be doubled the angle of the first arm 28. This means that, if only the ratio of the reduction ratio of the first reduction unit 24 to that of the second reduction unit 42 is made 2:1, and the first motor 20 and the second motor 38 are rotated in opposite directions at the same velocities, the point P2 can be moved linearly.

Next, a case where the second arm 46 is rotated from the status as shown in FIG. 9B in a clockwise direction by 2θ will be considered. Assuming that the third arm 54 is fixed with respect to the second arm 46, after the second arm 46 has been rotated by 2θ, the third arm 54 is in position B in FIG. 9C, i.e., the third arm 54 is in a position shifted from an objective position A in a clockwise direction by θ. Actually, the third arm 54 is connected to the joint member 36 by the steel belt 62 wound around the large pulley 60 and the small pulley 50, and therefore the third arm 54 is rotated in a counterclockwise direction around the point P2 in accordance with the clockwise rotation of the second arm 46. The rotational angle of the third arm 54 at this time is θ, since while the second arm 46 is rotated around a point P1 in the clockwise direction by 2θ, the joint member 36 in the point P1 is relatively rotated in the counterclockwise direction to the second arm 46 by 2θ as shown by an outlined arrow in FIG. 9C. Accordingly, the third arm 54 connected to the joint member 36 by the steel belt 62 via the small pulley 50 and the large pulley 60 is rotated in the counterclockwise direction by θ which is obtained by multiplying 2θ (the relative rotational angle of the joint member 36) by ½ (the ratio of the diameters of the two pulleys). As a result, the third arm 54 is moved to the point A on the straight line h, which means that the hand 58 is precisely moved along the straight line h.

In the above-described manner, a linear motion of the hand 58 can be attained, however, the same motion of the third arm 56 can be made by employing a rotational driving unit similar to the drivers of the first arm 28 and the second arm 46 instead of the pulleys. By rotating the third arm 56 in the rotational direction of the first arm 28 and also at the rotational velocity of the first arm 28, the hand 58 can be moved similarly to the case where the pulleys are used.

It goes without saying that when the first to third arms 28, 46 and 56 are rotated as shown in FIG. 8, only the first motor 20 is driven.

Figure 10:
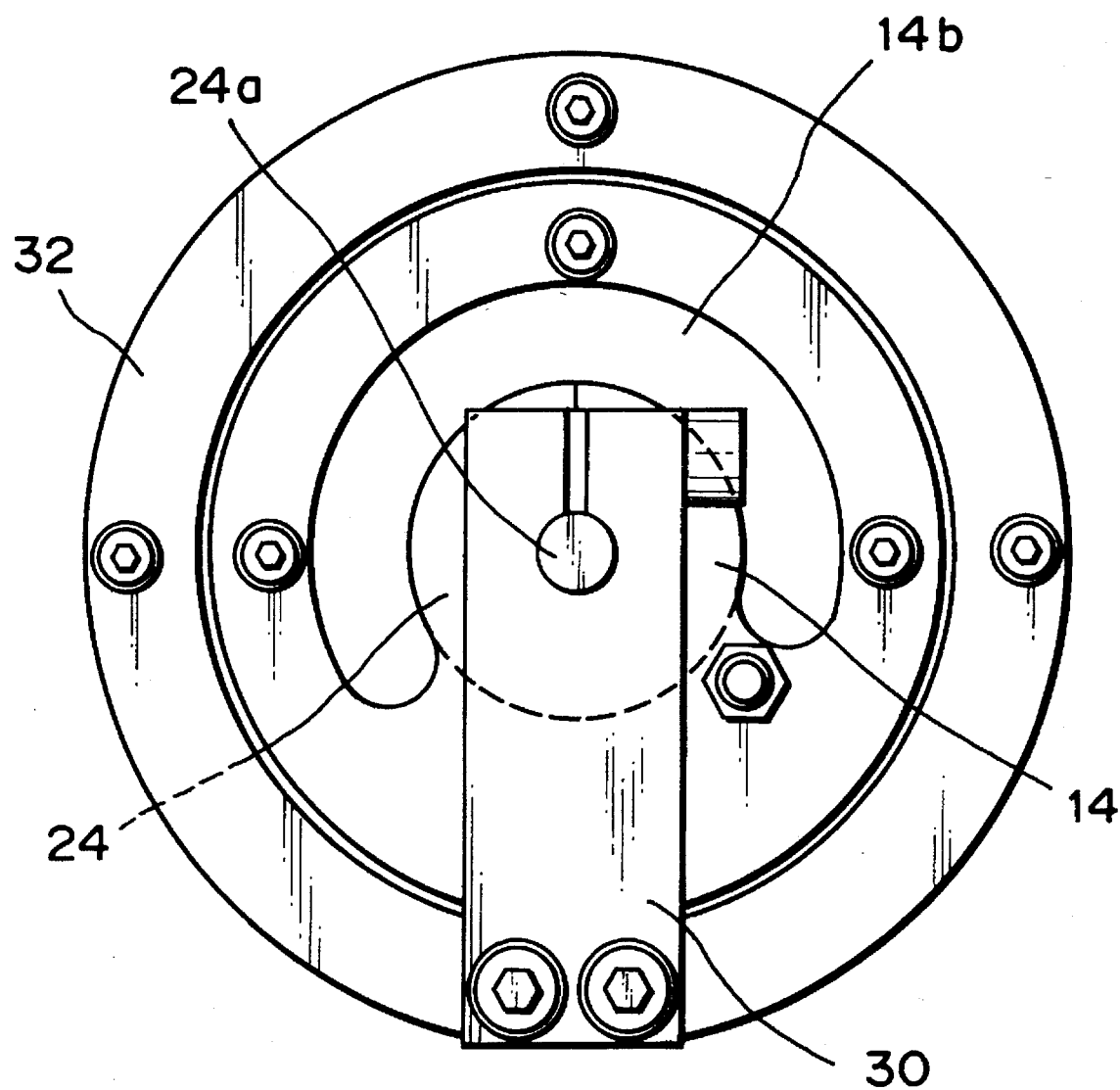
FIG. 10 illustrates a structure of a base and a first arm of the conveying robot.

Next, how to arrange air pipes to the hand 58 attached to the third arm 54 and the electric wiring to the respective motors will be described with reference to FIGS. 1 and 10. As the robot 10 of this embodiment usually works in a clean room, an air pipe 70 and a signal line 72 are laid within the robot 10.

First, the air pipe 70 and the signal line 72 which extend from the floor or the platform enter the robot base 12, where a line 72a of the signal lines 72 is connected to the first motor 20 and the first rotary encoder 22. A line 72b of the signal lines 72 and the air pipe 70 extend through the inside of the robot base 12, and enter the first arm 28 from the upper portion of the robot base 12. The joint portion of the first arm 28 and the robot base 12 is constituted as follows. The motor fixing plate 14 attached to the upper end portion of the robot base 12 has a crescent hole 14b which surrounds the first reduction unit 24. The air pipe 70 and the signal line 72b enter the first arm 28 through this hole 14b. The line 72b is connected to the second motor 38 and the second rotary encoder 40 in the first arm 28.

On the other hand, the air pipe 70 in the first arm 28 is connected to the joint member 36 and further connected to an air pipe 74 via air ducts 36b, 36c, 42b and 42c formed in the joint member 36 and in the output shaft 42a of the second reduction unit 42. More specifically, the air duct 36b is a tunnel formed through the joint member 36 from the lower surface to the upper surface. The upper end of the air duct 36b is connected with the air duct 36c which extends through the joint member 36 from the side to the center. The air duct 36c is further connected with a central hole 36d formed at the center of the joint member 36, into which the output shaft 42a of the second reduction unit 42 is inserted. The output shaft 42a has a hole 42b at the side portion, which is connected with the air duct 42c, like a tunnel which extends upward along the axis of the output shaft 42. Accordingly, air supplied by the air pipe 70 is introduced through the air ducts 36b and 36c, the hole 42b and the air duct 42c sequentially, to the air pipe 74 connected to the upper end portion of the output shaft 42a. At the upper and lower end portions of the central hole 36d, oil seals 75 are provided to prevent air leakage from the gap between the hole 36d and the output shaft 42a.

The air pipe 74 which runs through the second arm 46 is connected with an air duct 60a which opens in the lower surface of the pulley 60. As the upper end portion of the air duct 60a is connected with an air duct 56a formed in the rotating shaft 56, the air supplied from the air pipe 74 is introduced to the third arm 54 via the air ducts 60a and 56a.

As described above, the robot 10 is used in a clean room, for this purpose, magnetic seals 76, 78 and 80 are arranged to the respective rotating portions, and O rings 82, 84 and 86 are attached to the respective fixed portions. Further, a sealing member 88 is arranged at the opening portion of the air duct 36c at the side portion of the joint member 36 to prevent air leakage.

Next, a control unit of the robot 10 will be described with reference to FIG. 11.

Figure 11:
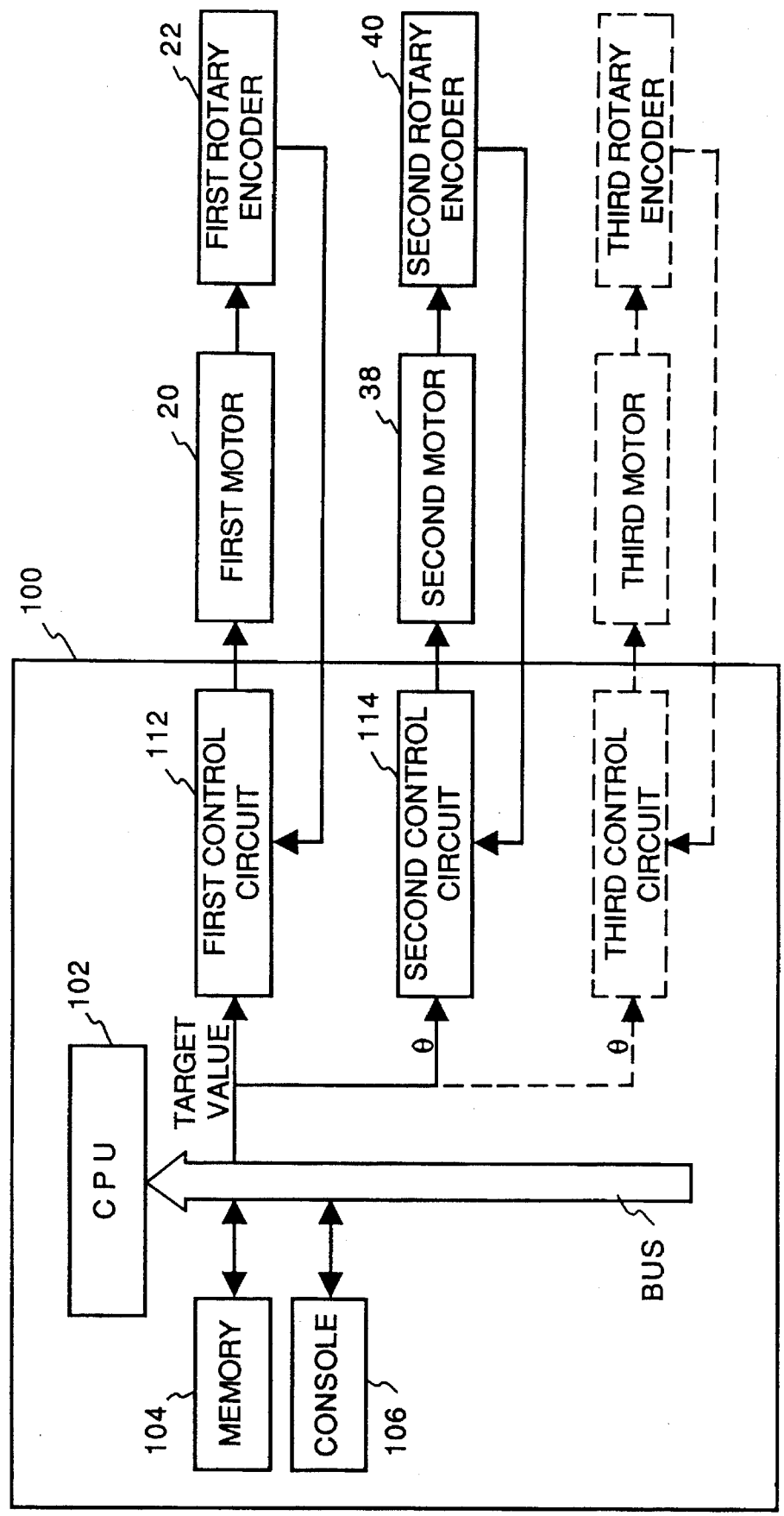
FIG. 11 is a block diagram showing a configuration of a control unit of the conveying robot.

In FIG. 11, a controller 100 comprises a CPU 102, a memory 104, a console 106, a first control circuit 112 and a second control circuit 114. The first motor 20 is connected to the first control circuit 112 which controls the rotation of the first motor 20 in accordance with position data outputted from the first rotary encoder 22 and velocity data outputted from the first rotary encoder 22 via a frequency/voltage (F/V) converter (not shown). Similarly, the second motor 38 is connected to the second control circuit 114 which controls the rotation of the second motor 38 in accordance with position data outputted from the second rotary encoder 40 and velocity data outputted from the second rotary encoder 40 via another F/V converter (not shown). If the third motor is used for driving the third arm 54, the controller 100 can further comprise a third control circuit having a similar structure to that of the first and second control circuits, as expressed by a broken line in FIG. 11. The first motor 20 and the second motor 38 are made using a publicly known numerical control.

Next, a control operation of the rotational angles of the first arm 28 and the second arm 46 of the robot 10 constituted in the above manner will be described with reference to FIGS. 12 to 16.

Figure 12:
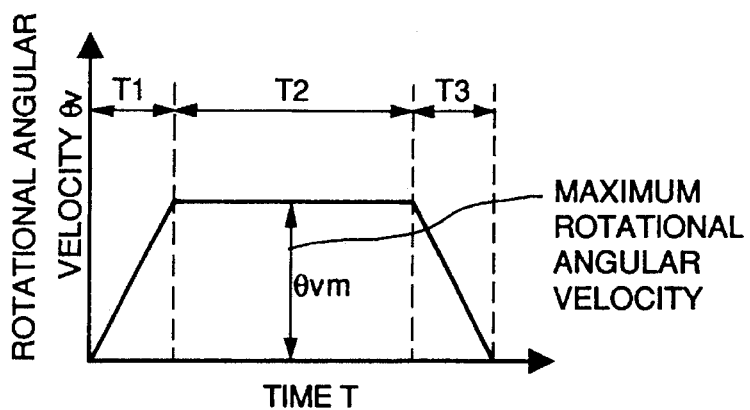
FIG. 12 shows the relationship between a rotational angular velocity and time.

FIG. 12 shows as an example of a rotational angular velocity change pattern with respect to time so that where an object is rotated in a direction by a rotational angle for a minimum period of time. According to this pattern, a velocity to rotate the object is raised at a constant angular acceleration to the maximum angular velocity. The object is moved at this maximum angular velocity, thereafter, the velocity is reduced at the same rate of the constant angular acceleration, then the object is stopped in a target position. As supplying capability of a driving power for moving an object is limited, if a possible maximum angular acceleration and a possible maximum angular velocity are determined, in a pattern for moving an object in the shortest period, conveying time period T2 at the maximum angular velocity θvm, acceleration time period T1 and deceleration time period T3 are determined based upon the maximum angular acceleration and the maximum angular velocity. In the robot 10, the angular velocity pattern as described above is used for the rotational motions of the first arm 28 and the second arm 46.

Figure 13:
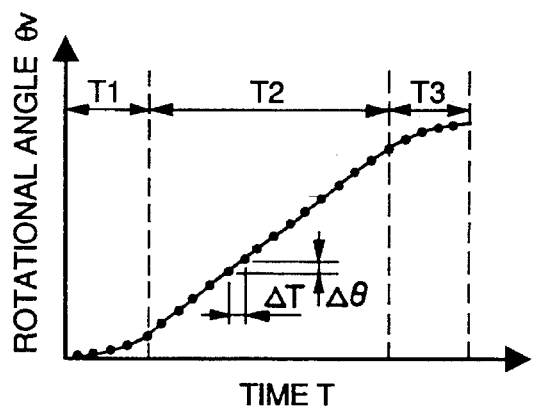
FIG. 13 shows the relationship between a rotational angle and time.

FIG. 13 shows ideal relationship between time T and a rotational angle θ according to the angular velocity pattern as described above, where dots on the ideal curved line are target values. An actual rotational angle θ is detected at every predetermined time interval ΔT, and the difference between the actual rotational angle θ and the target value is fed back, so that the object may be controlled to move to the target angle position.

Figure 14:
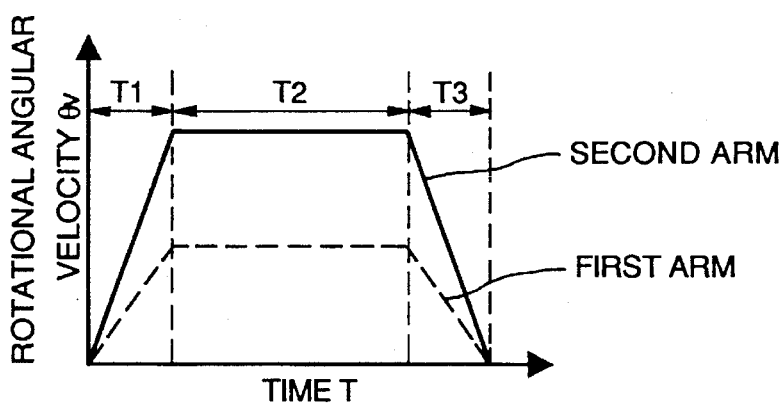
FIG. 14 shows the relationship between rotational angular velocities of the first arm and a second arm and time.
Figure 15:
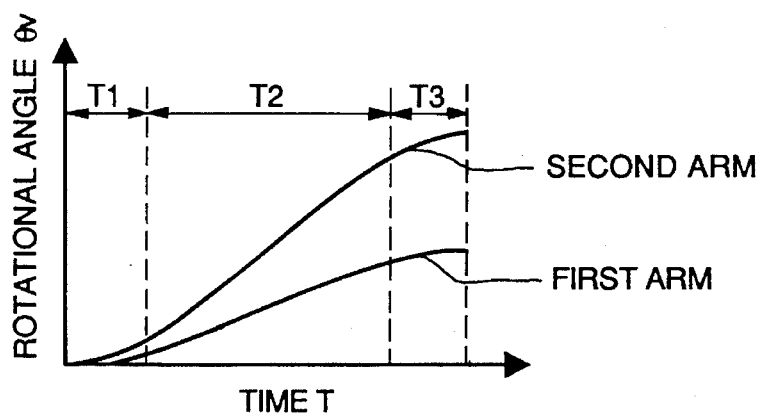
FIG. 15 shows the relationship between the rotational angular velocities of the first and second arms and time.

As described above, in order to linearly move the hand 58, it is necessary to rotate the first arm 28, e.g., in the counterclockwise direction by θ1, then the second arm 46 in the clockwise direction with respect to the first arm 28 by θ2=2θ1, and the third arm 54 in the counterclockwise direction with respect to the second arm 46 by θ3=θ1. When the above-described feed back control is applied to this operation, the relationship between the rotational angular velocity θv and time T and the relationship between the rotational angle θ and time T are as shown in FIGS. 14 and 15. As shown in FIG. 14, by maintaining the ratio of the rotational angular velocity θ1v of the first arm 28 to the rotational angular velocity θ2v of the second arm 46 as 1:2, the ratio of the rotational angle θ1 of the first arm 28 to the rotational angle θ2 of the second arm 46 can be maintained as 1:2 as shown in FIG. 15. Further, as the third arm 54 is driven by the small pulley 50 and the large pulley 60, if the pulleys are driven so that the ratio of the rotational angle θ1 of the first arm 28 to the rotational angle θ2 of the second arm 46 become 1:2, the third arm 54 is rotated in the same direction as that of the first arm 28 and by the same rotational angle as that of the first arm 28, thus the linear motion of the hand 58 can be attained.

Figure 16:
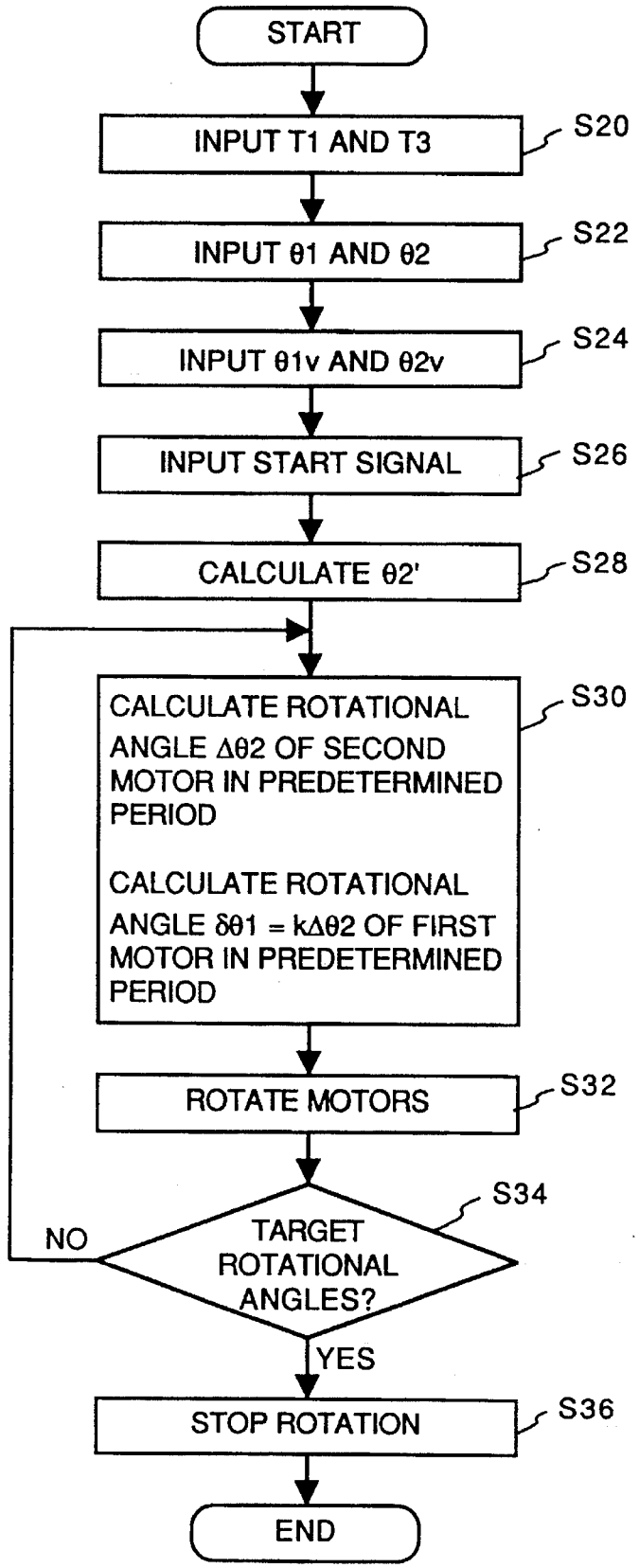
FIG. 16 is a flowchart showing an operation for straightforward motion of a hand.

The control operation of the rotational motions of the first arm 28 and the second arm 46 will be described with reference to a flowchart of FIG. 16.

It is premised that an operator have calculated from coordinates of an object position of the hand 58 the rotational angles θ1 and θ2 of the first arm 28 and the second arm 46, the acceleration time T1 and the deceleration time T3 of the rotation, the maximum rotational angular velocity θ1vm of the first arm 28 and the maximum rotational angular velocity θ2vm of the second arm 46, and the conveying time T2 at these maximum angular velocities before the operator starts the robot 10. The control operation will follow this preparatory operation.

First, in step S20, the operator inputs from the console 106 the values of the acceleration time T1 and the deceleration time T3 in FIG. 12. The inputted values are stored in the memory 104. In step S22, the operator inputs the destination rotational angles θ1 and θ2 of the first arm 28 and the second arm 46 from the console 106. Also the input values are stored in the memory 104. Similarly, the operator inputs from the console 106 the maximum rotational velocities θ1vm and θ2vm of the first arm 28 and the second arm 46 in step S24, and the inputted values are stored in the memory 104. When these input operations are completed, the robot 10 is in a standby status for moving the hand 58.

Next, the operator inputs a start signal from the console 106 in step S26, the CPU 102 calculates a target rotational angle θ2' of the second motor 38 which drives the second arm 46 having a large rotational angle in step S28. The flow advances to step S30, where the CPU 102 calculates Δθ2, a rotational angle of the second motor 38 in a predetermined period of time ΔT (e.g., in 5 msec). At the same time, the CPU 102 calculates Δθ1 (Δθ1=kΔθ2), a rotational angle of the first motor 20 in a predetermined period of time by increasing the rotational angle Δθ2 of the second motor 38 by k times. k denotes a ratio of the rotational angle of the first motor 20 to that of the second motor 38. In this embodiment, by setting the reduction ratio of the second reduction unit 42 as ½ of that of the first reduction unit 24, the first motor 20 and the second motor 38 are rotated in the same rotational angular velocities, and then the hand 58 is moved straight-forwardly. Accordingly, in this case it is determined k=1. However, it is not necessary that the reduction ratio of the second reduction unit 42 is ½ of that of the first reduction unit 24. The value k can be changed in accordance with the reduction ratios of these reduction units. For example, if the reduction ratio of the first reduction unit 24 and that of the second reduction unit 42 are the same, it is determined that k=½.

In step S32, the CPU 102 calculates accelerations for rotating the first motor 20 and the second motor 38 by respective rotational angles Δθ1 and Δθ2 in a predetermined period of time, and rotates the first motor 20 and the second motor 38 at these accelerations. Further, while the CPU rotates the first motor 20 and the second motor 38, it detects rotational angles of the motors in every predetermined period of time ΔT by using the first encoder 22 and the second rotary encoder 40. In step S34, it is determined whether the first motor 20 and the second motor 38 have been rotated to the target rotational angles. If No, the flow returns to step S30. If it is determined that the first motor 20 and the second motor 38 have reached the target rotational angles θ1' and θ2' in step S34, the respective motors are stopped in step S36 and the control operation is terminated.

In order to have the robot 10 make a rotational motion as shown in FIGS. 8A and 8B, the operator inputs a command for the rotational movement from the console 106. The CPU 102 stores the command into the memory 104, at the same time transmits a command to the first control circuit 112 to rotate the hand 58 by a predetermined rotational angle and at a predetermined rotational velocity to a desired position.

In this embodiment, the robot 10 is described as a clean robot for conveying wafers and reticles, however, the robot 10 is not limited to the clean robot, it can be a general industrial robot, or a robot used outside of a clean room.

Further, the air for vacuum absorption is introduced through the air ducts formed in the joint member and the rotating shaft. However, a through hole can be formed in the joint member and the air pipe can be inserted through this hole.

In this embodiment, the steel belt is wound around the small pulley and the large pulley. The small pulley and the large pulley can be geared pulleys with a timing belt.

According to this embodiment, the robot has first to third driving means for rotating the first to third arms. The respective arms are rotated with simple velocity ratios such as the same or doubled angular velocities by these driving means. Thus the robot which has the simple mechanism and which is capable of a linear conveying motion by simple control is provided.

SECOND EMBODIMENT

A second embodiment according to the present invention will be described below.

The structure of a clean robot 200 of the second embodiment will be described with reference to a sectional view of FIG. 17 and a partial sectional view of FIG. 18.

Figure 17:
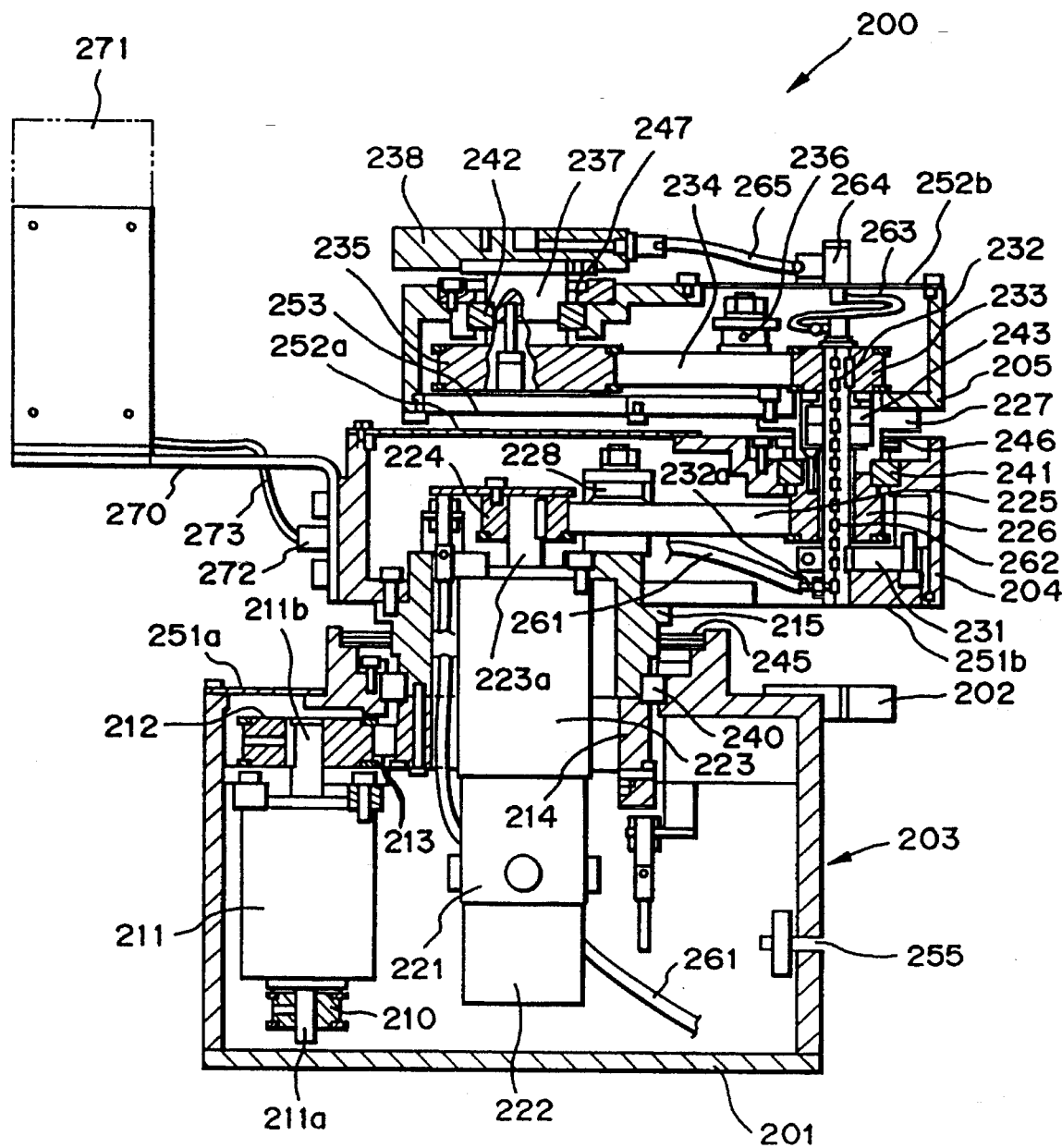
FIG. 17 is a sectional view showing a structure of a clean robot according to a second embodiment.
Figure 18:
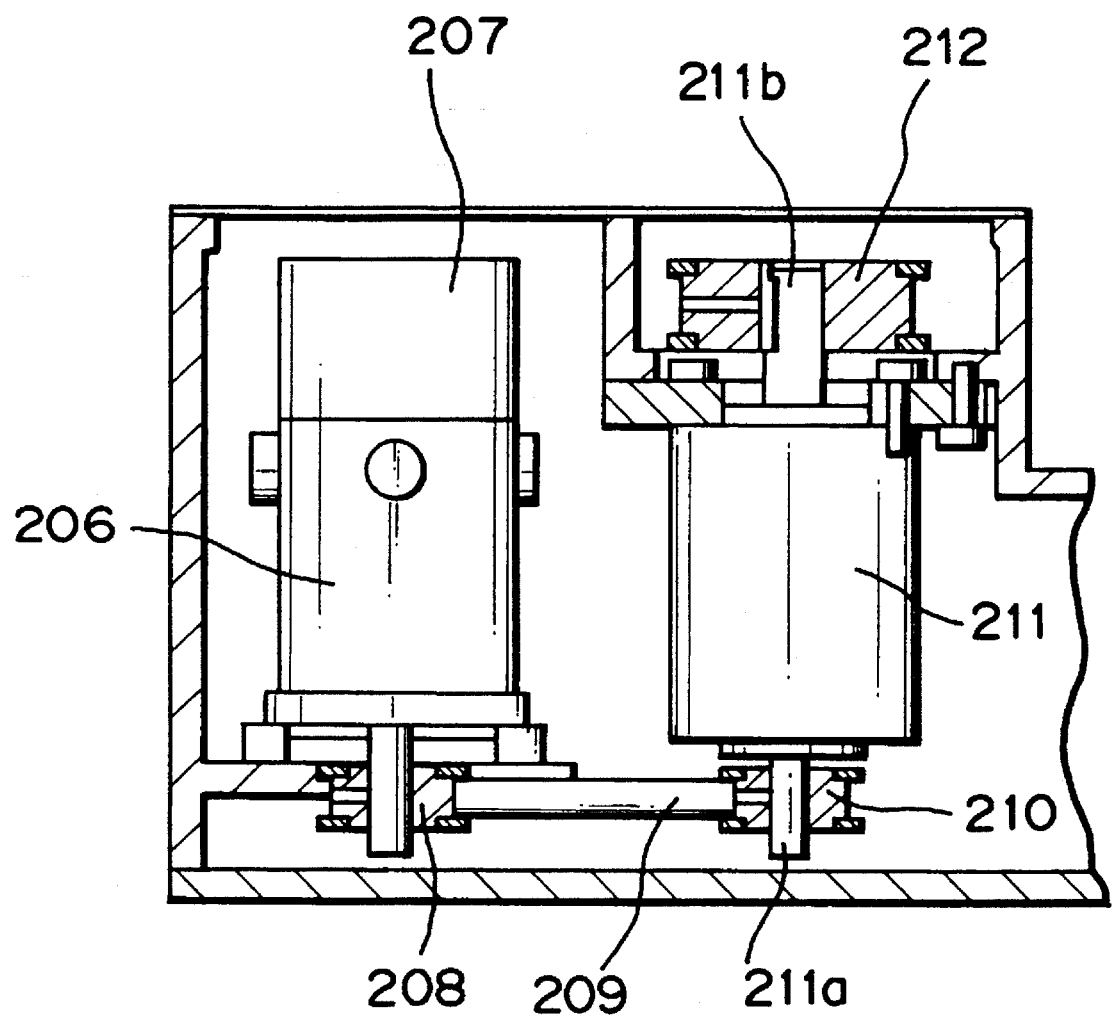
FIG. 18 is a partial sectional view of FIG. 17 illustrated from a left side.

In FIGS. 17 and 18, a robot base 203 has a base flange 201 at its lower portion, and has an arbitrary number of attaching levers 202 at its upper portion. The robot base 203 is fixed in a semiconductor manufacturing apparatus with bolts or the like via the base flange 201 and the attaching levers 202. Inside of the robot base 203, a first arm driving motor 206 which supplies a driving force for driving a first arm 204 to rotate with respect to the robot base 203 is arranged. To an upper output shaft of the first arm driving motor 206, a first rotary encoder 207 for detecting a rotating position of the motor 206 is attached, and to a lower output shaft of the motor 206, a first pulley 208 is attached. In an adjacent position to the motor 206, a first reduction unit 211 for reducing the rotation of the motor 206 is arranged, and to an input shaft 211a located under the first reduction unit 211, a second pulley 210 is attached. The first pulley and the second pulley 210 are coupled by a first timing belt 209. Via the first timing belt 209, the rotational force of the motor 206 is transmitted to the first reduction unit 211. To an output shaft 211b positioned on the first reduction unit 211, a third pulley 212 is attached.

On the other hand, to the first arm 204, a fourth pulley 214 is fixed with bolts or the like via a fixed flange 215. The third pulley 212 and the fourth pulley 214 are coupled by a second timing belt 213. Accordingly, the rotational force of the first arm driving motor 206 is transmitted via the first pulley 208, the first timing belt 209 and the second pulley 210 sequentially to the first reduction unit 211, where the rotational force is reduced in a predetermined reduction ratio, thereafter transmitted via the third pulley 212, the second timing belt 213 and the fourth pulley 214 to the first arm 204. The first arm 204 is driven to rotate within a horizontal surface with respect to the robot base 203.

The fixed flange 215 has a substantially cylindrical shape with a sealed upper end portion. Under the lower surface of the ceiling portion of the flange 215, a second arm driving motor 221, a second rotary encoder 222 and a second reduction unit 223 are fixed via bolts or the like. The second rotary encoder 222 is connected to the lower portion of the motor 221, and the second reduction unit 223 is fixed to the upper portion of the motor 221. The second reduction unit 223 includes an output shaft 223a, to which a fifth pulley 224 is fixed.

Under a second arm 205, a sixth pulley 226 is fixed by bolts or the like via a fixed flange 227. The sixth pulley 226 enters the first arm 204 from an opening hole at the end portion of the first arm 204. The fifth pulley 224 and the sixth pulley 226 is bound by a third timing belt 225 wound around the pulleys. The rotational force of the fifth pulley 224 is transmitted to the sixth pulley 226 via the third timing belt 225. Accordingly, the rotational force of the second arm driving motor 221 is reduced according to a predetermined reduction ratio, then transmitted via the fifth pulley 224, the third timing belt 225 and the sixth pulley 226, to the second arm 205 which is driven to rotate in a horizontal surface with respect to the first arm 204.

In an intermediate position between the fifth pulley 224 and the sixth pulley 226, a first idle pulley 228 is arranged for adjusting a tensile force of the third timing belt 225.

At the central portion of the fixed flange 227 and the sixth pulley 226, a rotating shaft 232 is arranged through both in a vertical direction. The rotating shaft 232 is supported by a first bearing 241 rotatably with respect to the fixed flange 227 and the sixth pulley 226, i.e., the second arm 205. The lower end portion of the rotating shaft 232 is fixed to the inside of the first arm 204 by a lever 231. To the upper end portion of the rotating shaft 232, a seventh pulley 233 is fixed.

Under a third arm 238, fixed with bolts or the like via a fixed flange 237 is an eighth pulley 235, which enters the second arm 205 from an opening hole formed at the end portion of the second arm 205. The seventh pulley 233 and the eighth pulley 235 are coupled by a fourth timing belt 234, via which the rotational force of the seventh pulley 233 is transmitted to the eighth pulley 235. In an intermediate position of the seventh pulley 233 and the eighth pulley 235, a second idle pulley 236 is arranged to adjust a tensile force of the fourth timing belt 234.

The third arm 238 is fixed on the fixed flange 237. On the upper surface of the third arm 238, a pair of fingers (not shown) for clamping reticles and wafers and the like can be attached.

The first arm 204 is rotatably supported with respect to the robot base 203 via a first bearing 240, the second arm 205 is rotatably supported with respect to the first arm 204 via a second bearing 241, and the third arm 238 is rotatably supported with respect to the second arm 205 via a third bearing 242.

The robot base 203, the first arm 204 and the second arm 205 respectively have opening holes from which mechanical parts are introduced. In order to prevent dust from the inside of the robot, these opening holes are covered with covering plates 251a, 251b, 252a, 252b and 253. As the surfaces of these covering plates and the contact faces of the robot base 203, the first arm 204 and the second arm 205 are smoothly finished, the robot base 203, the first arm 204 and the second arm 205 is reliably sealed with the covering plates 251a, 251b, 252a, 252b and 253. Further, the opening holes covered with the covering plates can be more tightly sealed using rubber, silicon and the like. Regarding rotating portions, magnetic fluid seals 245 to 247 are arranged to avoid dust drifted out from the inside.

Figure 19:
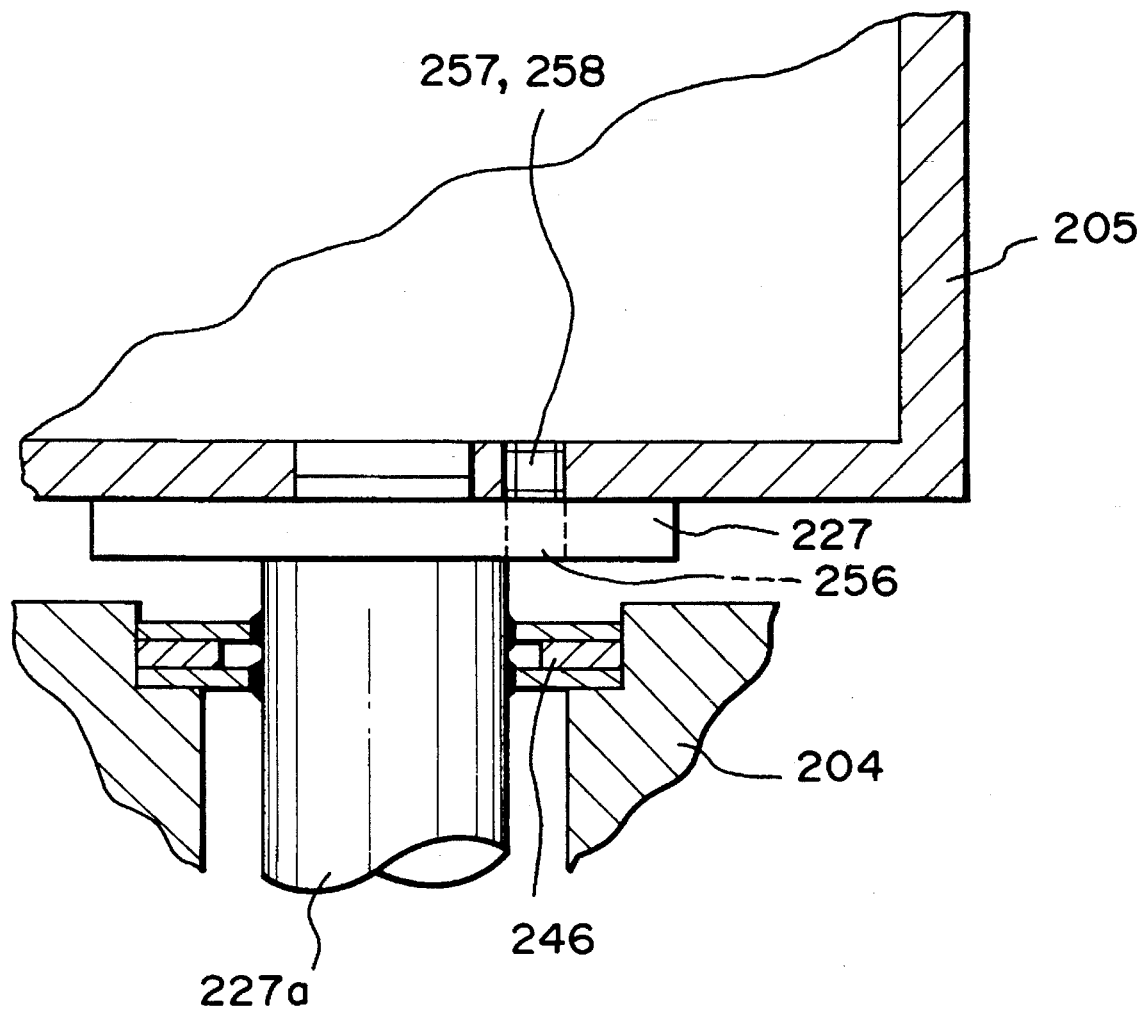
FIG. 19 is an enlarged sectional view of rotating portions of the first and second arms.

As shown in FIG. 19, the second arm 205 has a tapped hole 257, and the fixed flange 227 has a through hole 256, for setting the magnetic fluid seals at the rotating portions after assembling and adjusting of the mechanical members. The magnetic fluid seal is filled from the tapped hole 257, then the tapped hole 257 is plugged with a set screw 258.

In a sealed robot, as motors radiate heat and the inner temperature becomes higher, the problems is that the air inside of the robot body swells to break magnetic fluid seals. For this reason, the robot base 203 incorporates a filter 255 to maintain the inner pressure the same as the outer pressure. The air passes through this filter 255, and dust is kept inside.

Figure 20:
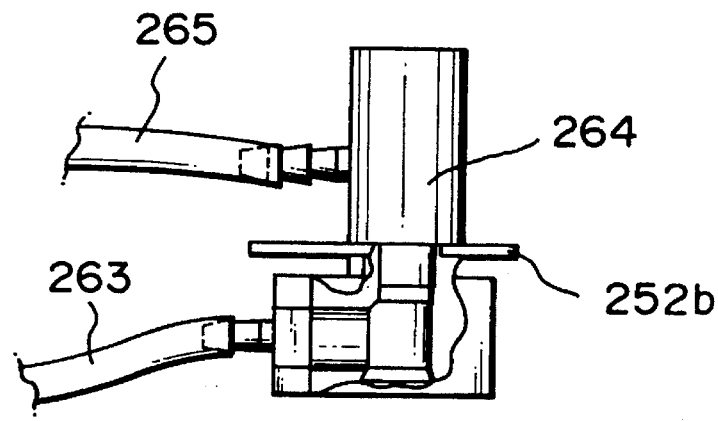
FIG. 20 is an enlarged sectional view of an air joint.

Clamping of wafers and reticles are performed by vacuum absorption. An air pipe for this absorption is introduced into the robot base 203 from the outside, and from the robot body 203, an air tube 261 enters the first arm 204 via an electric valve (not shown) (a part of the valve is connected to a vacuum pressure sensor 267) from a piping hole formed at the upper portion of the fixed flange 215. The air tube 261 in the first arm 204 is connected to a piping portion 232a of the rotating shaft 232. The rotating shaft 232 is a hollow shaft, through which the air passes. An air tube 263 is connected to the upper portion of the rotating shaft 232. The air tube 263 is connected to a joint 264 attached to the cover 252b as shown in FIG. 20. This joint 264 is arranged outside of the robot body. An air tube 265 is connected to the joint 264, and an air circuit is supplied to the third arm 238 via this air tube.

Figure 21:
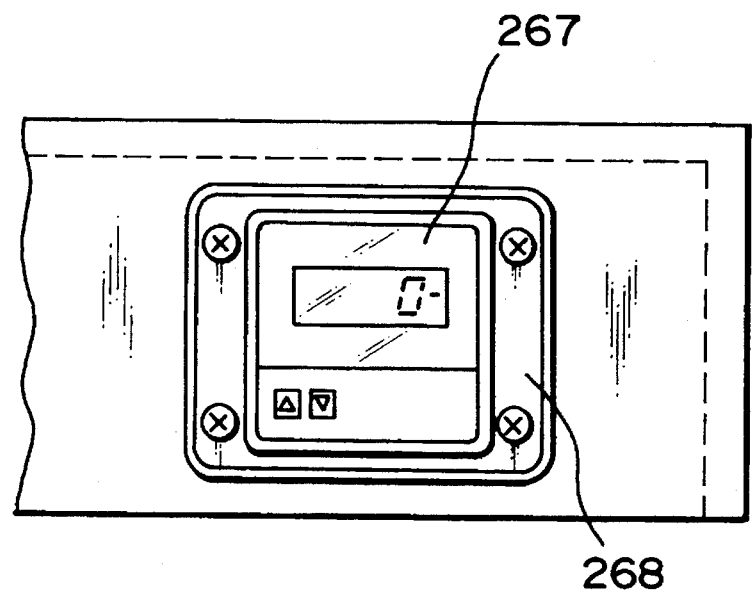
FIG. 21 illustrates a vacuum pressure sensor.

As shown in FIG. 21, the vacuum pressure sensor 267 is covered with a removable transparent cover 268 so that operation statuses and various settings can be checked.

Figure 22:
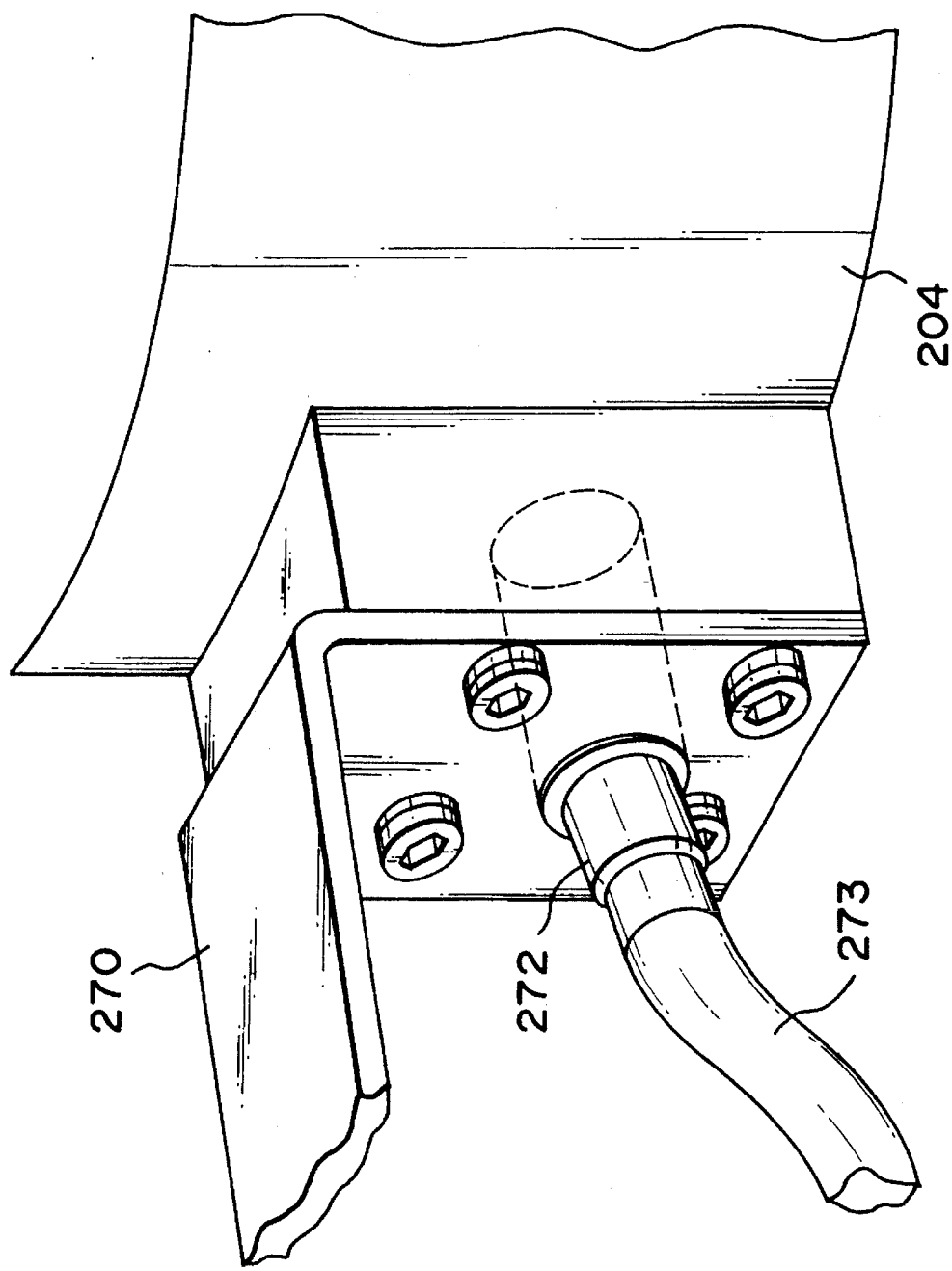
FIG. 22 is an enlarged view of an attaching portion and a connector of an external sensor.
Figure 23:
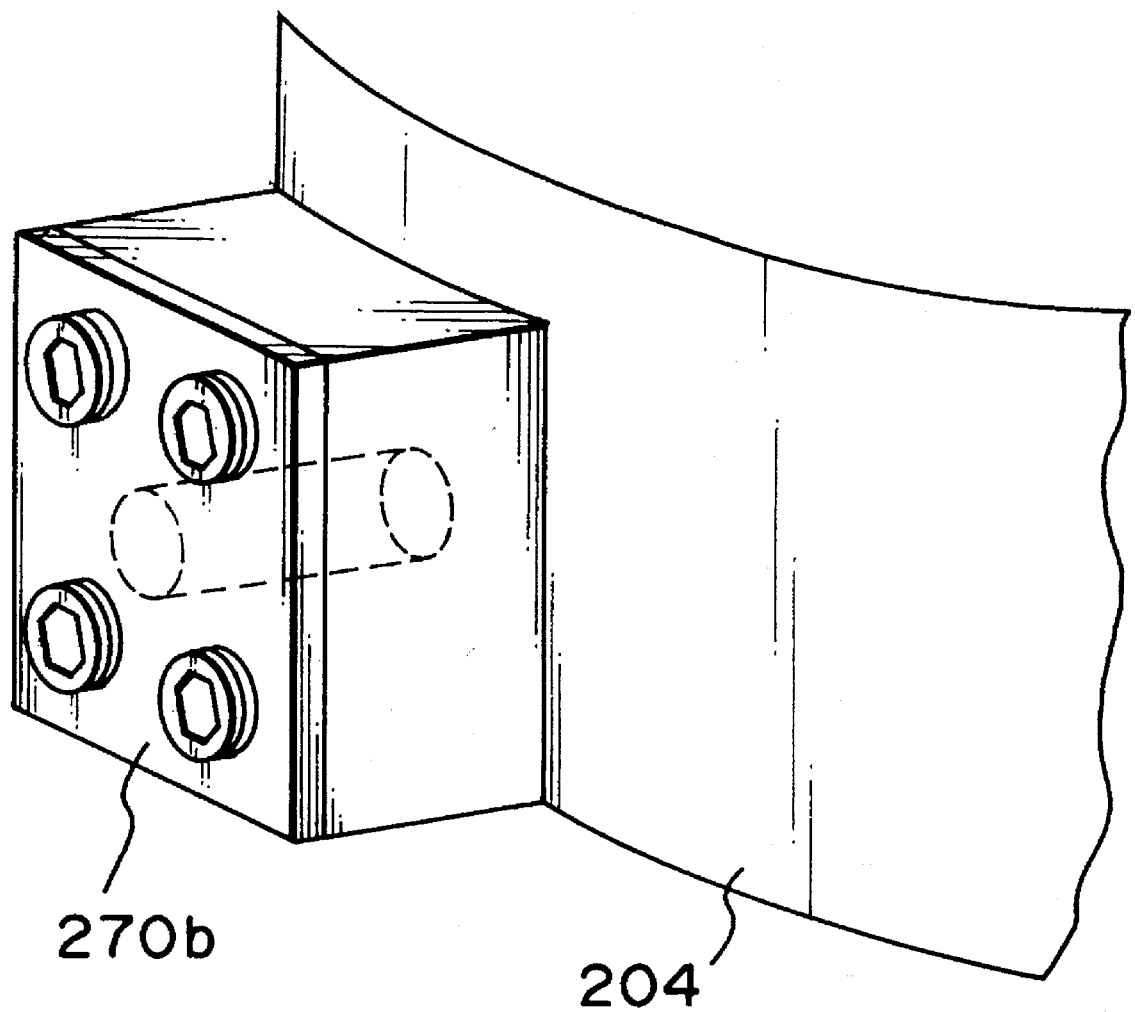
FIG. 23 is an enlarged view of a covered attaching portion when the external sensor is not needed.

FIG. 22 shows a wiring connector portion of an external sensor 271 which is a bar code reader for reading bar codes adhered to objects to be conveyed and discriminating kinds of the objects. A wiring connector 272 is attached to an external attaching plate 270 at its attaching portion to the first arm 204 for easy attachment of the connector. Further, a hole formed in the first arm 204, into which the connector 272 is fit, can be covered with the attaching plate 270 to shut up the hole to keep dust inside. As shown in FIG. 23, when the external sensor 271 is not used, a cover 270b is attached in place of the external attaching plate 270.

Figure 24:
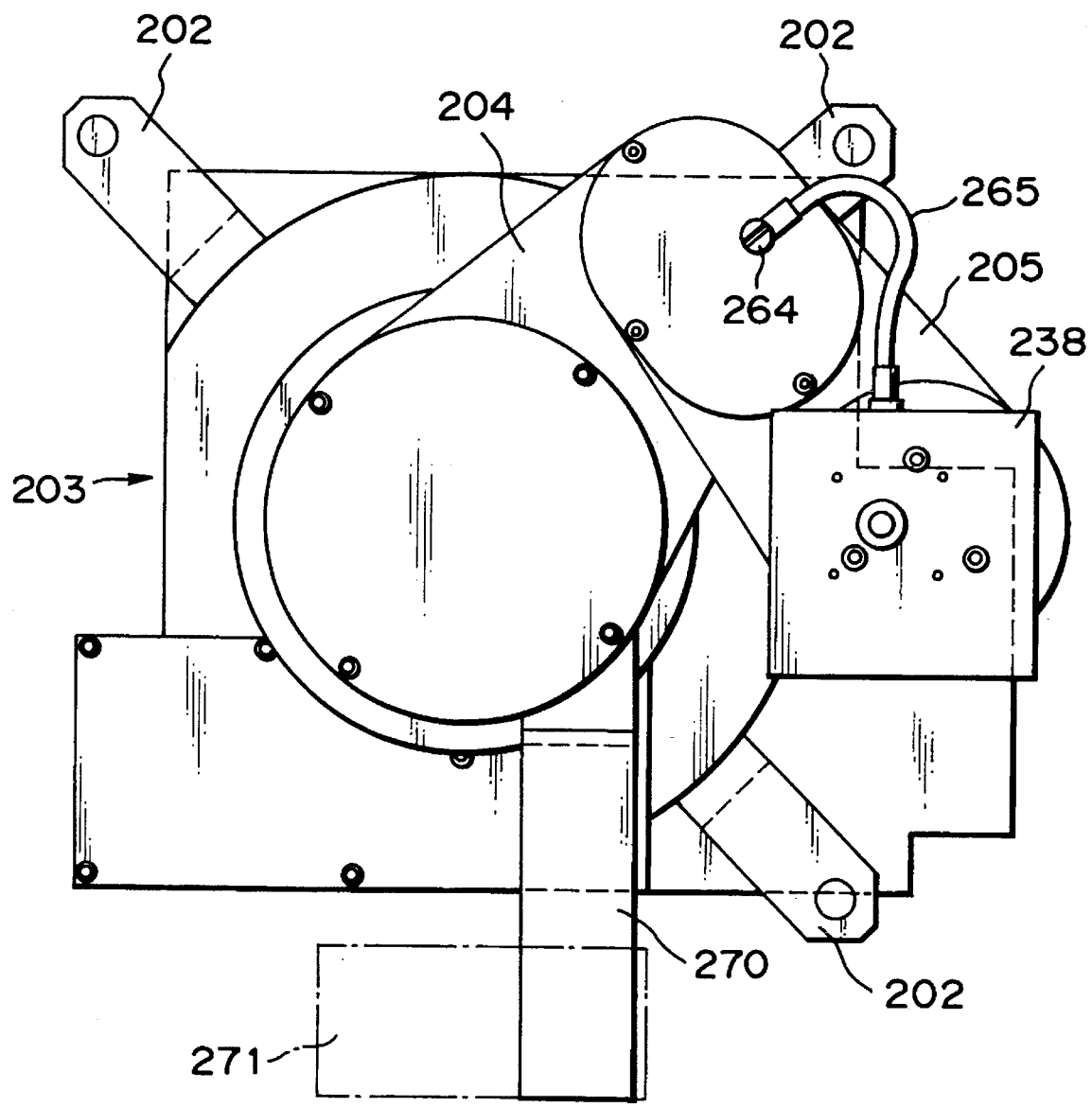
FIG. 24 is a top plan view of the clean robot.

FIG. 24 is a top view of FIG. 1, where the positional relationship in the robot base 203, the first arm 204, the second arm 205 and the third arm 238 is shown.

Next, the principles of the operation of the above-constituted robot will be described with reference to FIGS. 25A to 25C and FIGS. 26A and 26B. The motion patterns of the robot for conveying wafers and reticles are linear, and as shown in FIGS. 26A and 26B, rotational.

First, a case where a hand 280 is moved along the straight line h orthogonal to the reference straight line i will be described. It is premised that the length of the first arm 204 and that of the second arm 205 are the same (=L), and that the respective rotational angles of the first arm 204, the second arm 205 and the third arm 238 are represented as $\theta 1$, $\theta 2$ and $\theta 3$. At this time, if the first to third arms 204, 205 and 238 are moved in a status where $\theta 1$, $\theta 2$ and $\theta 3$ are in the following relationship, the end portion of the third arm 238, i.e., the hand 280 moves linearly along the straight line h:

$\theta 2 = 180° - 2 \cdot \theta 1$ $\theta 3 = \theta 2/2$ (where, $\theta 1 = -60°$ to $60°$ $\theta 2 = 300°$ to $60°$ $\theta 3 = 150°$ to $30°$)

In order to realize the above motion of the hand 280, in the robot of this embodiment, two motors having the same characteristics are employed as the first arm driving motor 206 and the second arm driving motor 221. The ratio of the reduction ratio of the first arm driver to that of the second arm driver is 2:1. Note that in this embodiment, the reduction ratio of the first arm driver is 1/200, and that of the second arm driver is also 1/100. As shown in FIGS. 27A and 27B, the reduction ratios of the respective pulleys and the reduction units can be determined arbitrarily, however, in this embodiment, it is determined that the reduction ratio of the first arm driver between the first pulley 208 and the second pulley 210 is 1/1.6, and between the fifth pulley 224 and the sixth pulley 226, 1/1.

Figure 25C:
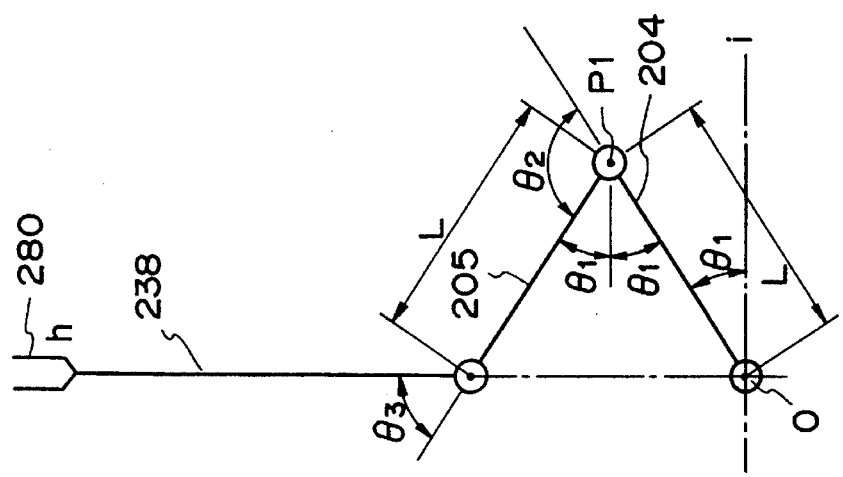
FIGS. 25A to 25C illustrate a linear conveying motion of a hand.
Figure 25B:
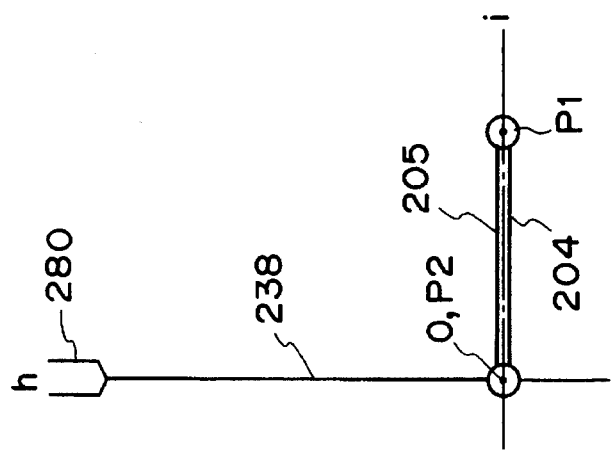
Figure 25A:
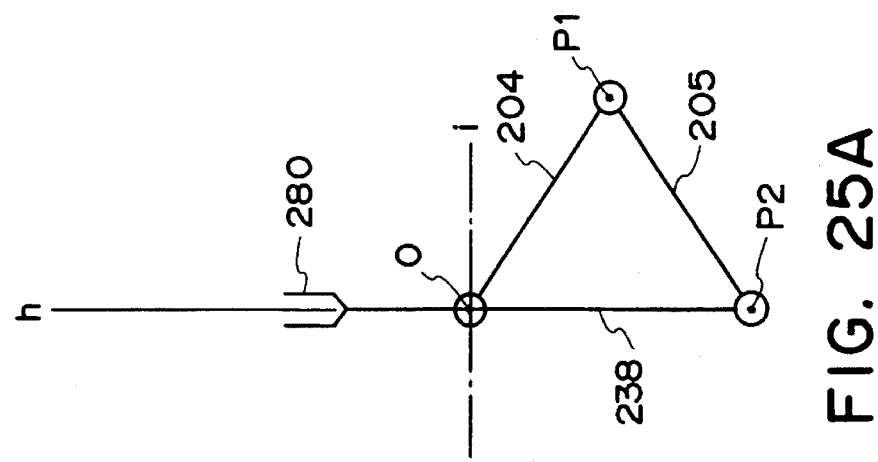
Figure 26B:
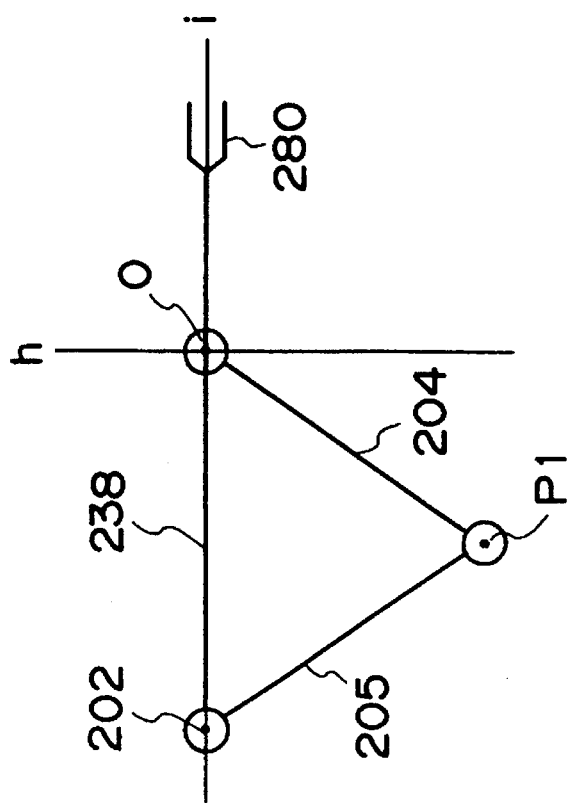
FIGS. 26A and 26B illustrate a rotational motion of the hand.
Figure 26A:
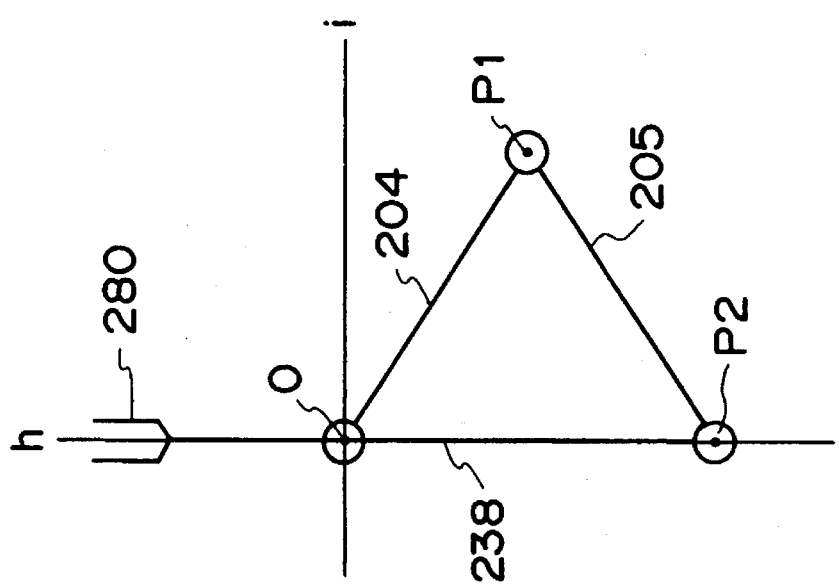

More specifically, when the first arm driving motor 206 and the second arm driving motor 221 are rotated in opposite directions at the same rotational velocities, and the first arm 204 is rotated around an origin O as shown in FIG. 25C in a counterclockwise direction by $\theta 1$, the second arm 205 is rotated around a point P1, i.e., the end portion of the first arm 204 in a clockwise direction by $2\theta 1$. By these motions, the pivotal point P2 of the third arm 238 is moved along the straight line h.

Regarding the third arm 238, the hand 280 can be moved along the straight line h by setting the diameter of the seventh pulley 233 as ½ of that of the eighth pulley 235, i.e., satisfying the relationship $\theta 3 = \theta 2/2$.

The hand 280 is moved along the straight line h in the above-described manner. It should be noted that pulleys are not necessarily employed for rotating/driving the third arm 238. For example, similarly to the driving of the first arm 204 and the second arm 205, a driver can be arranged in the third arm 238 to rotate the third arm 238 in the same direction of that of the first arm 204 at the same rotational velocity as that of the first arm 204. This arrangement can attain the same motion of the third arm 238.

It should be noted that when the arms make a rotational motion as shown in FIGS. 26A and 26B, only the first arm driving motor 206 can be rotated.

Figure 28:
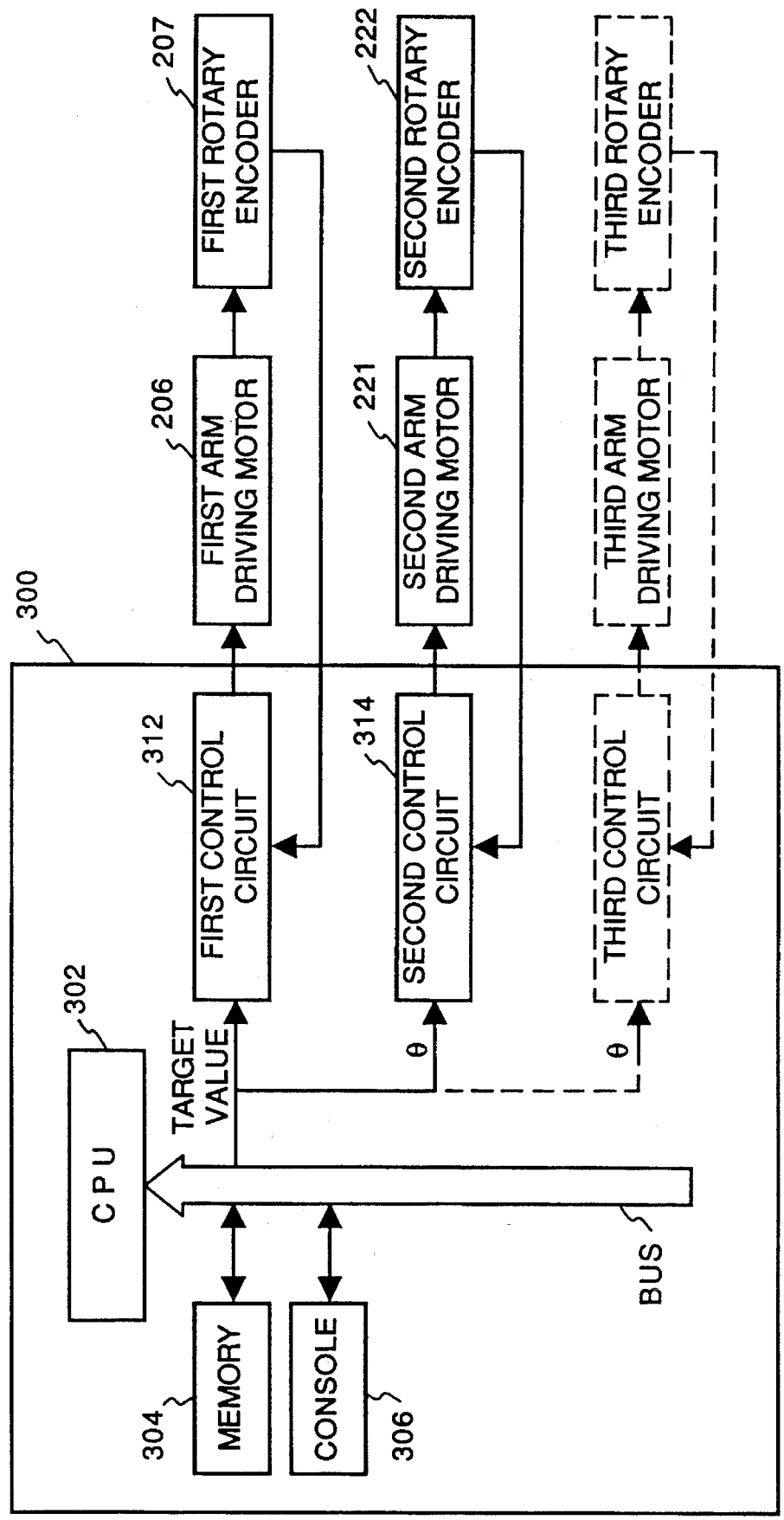
FIG. 28 is a block diagram showing a configuration of a control unit of the clean robot.

Next, a control unit of the robot of this embodiment will be described with reference to FIG. 28. A controller 300 comprises a CPU 302, a memory 304, a console 306, a first control circuit 312 and a second control circuit 314. The first arm driving motor 206 is connected to the first control circuit 312, which controls the rotation of the first arm driving motor 206 in accordance with position data outputted from the first rotary encoder 207 and velocity data outputted from the first rotary encoder 207 via a F/V converter (not shown). Similarly, the second control circuit 314 controls the rotation of the second arm driving motor 221 in accordance with position data outputted from the second rotary encoder 222 and velocity data outputted from the second rotary encoder 222 via another F/V converter (not shown). Further, in case a third arm driving motor is employed to drive the third arm 238, a third control circuit having the same structure of that of the first and second control circuits 312 and 314 can be arranged as expressed by a broken line in FIG. 28. Note that the first arm driving motor 206 and the second arm driving motor 221 are controlled by a publicly known numerical control.

Next, a control operation of the rotational angles of the first arm 204 and the second arm 205 of the above-constituted robot 200 will be described with reference to FIGS. 29 to 33.

Figure 29:
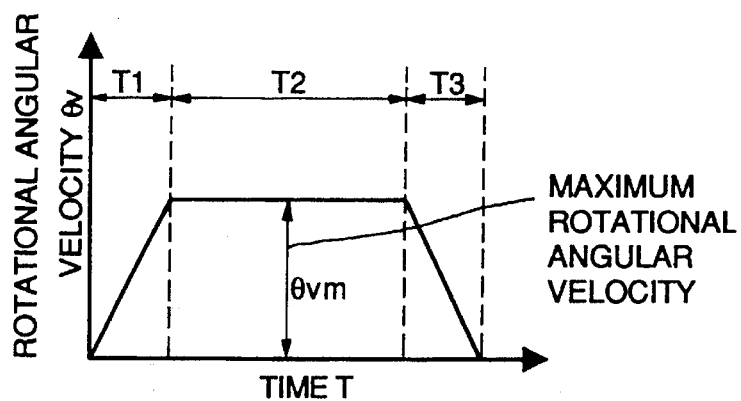
FIG. 29 shows the relationship between a rotational angular velocity and time.

When an object to be conveyed is rotated in a direction by a rotational angle, an angular velocity change pattern with respect to time is as shown in FIG. 29. In this pattern, a conveying velocity is accelerated at a constant acceleration until the maximum angular velocity is obtained, then the object is moved at this maximum angular velocity, thereafter, the velocity is reduced at the same constant acceleration as that during accelerating time period, and the object is stopped in an object position. Generally, as a driving power source for moving an object is limited, if the possible maximum angular acceleration and the maximum angular velocity are defined, conveying time period T2 at the maximum angular velocity θvm, acceleration time T1 and deceleration time period T3 in a pattern for moving the object within the shortest period are determined. In the robot 200 of this embodiment, an angular velocity pattern as described above is applied to the rotational operation of the first arm 204 and the second arm 205.

Figure 30:
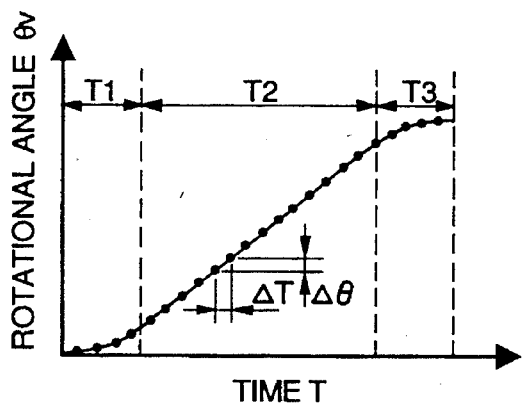
FIG. 30 shows the relationship between a rotational angle and time.

FIG. 30 shows an ideal relationship between the rotational angle θ and time T while an object is conveyed in accordance with an angular velocity pattern as described above. Dots on the ideal curved line are target values at predetermined intervals. An actual rotational angle θ is detected at every predetermined interval ΔT, and the difference between the actual rotational angle and the target value is feedback-controlled to rotate the object to be conveyed by a target rotational angle.

Figure 31:
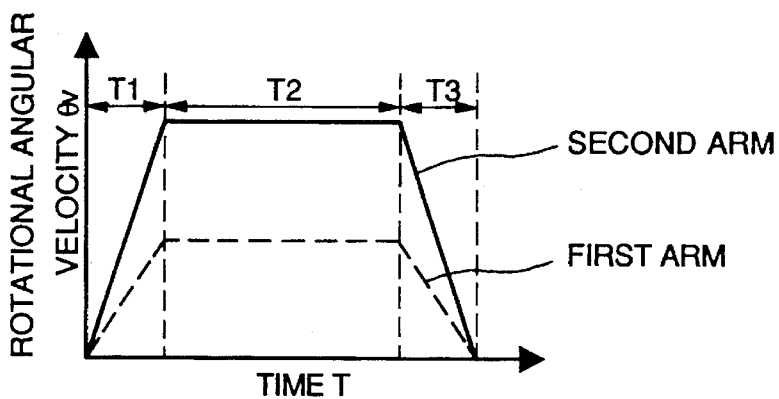
FIG. 31 shows the relationship between rotational angular velocities of a first and a second arms and time.
Figure 32:
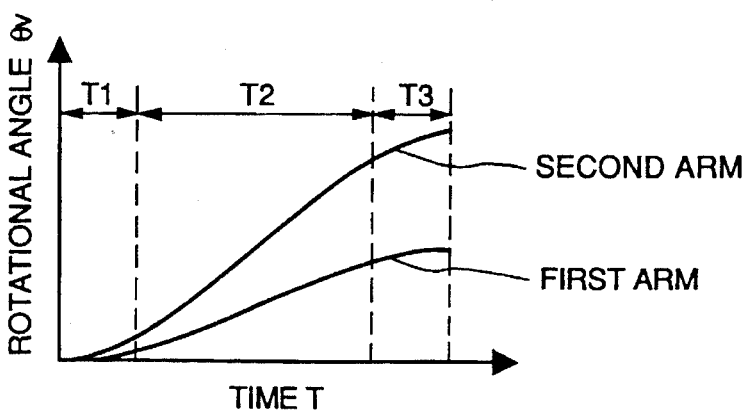
FIG. 32 shows the relationship between rotational angles of the first and second arms and time.

As described above, in order to move the hand 280 linearly, it is necessary to rotate the first arm 204, e.g., in a counterclockwise direction by θ1, then to rotate the second arm 205 in a clockwise direction with respect to the first arm 204 by θ2 (=2θ1) and to rotate the third arm 238 in the counterclockwise direction with respect to the second arm 205 by θ3 (=θ1). If the above control method is applied to the operations of the arms, the relationship between the rotational angular velocity θv and time T is as shown in FIGS. 31 and 32. As the ratio of the rotational angular velocity θ1v of the first arm to the rotational angular velocity θ2v is maintained 1:2 in FIG. 31, the ratio of the rotational angle θ1 of the first arm 204 to the rotational angle θ2 of the second arm 205 is always 1:2 in FIG. 32. As the third arm 238 is driven by the seventh pulley 233 and the eighth pulley 235, if the first arm 204 and the second arm 205 are moved on condition that the ratio of the rotational angle θ1 of the first arm 204 to the rotational angle θ2 of the second arm 205 is 1:2, the third arm 238 is rotated in the same rotational direction as that of the first arm 204 and by the same rotational angle as that of the first arm 204, i.e., the hand 280 can be linearly moved in a precise manner.

Figure 33:
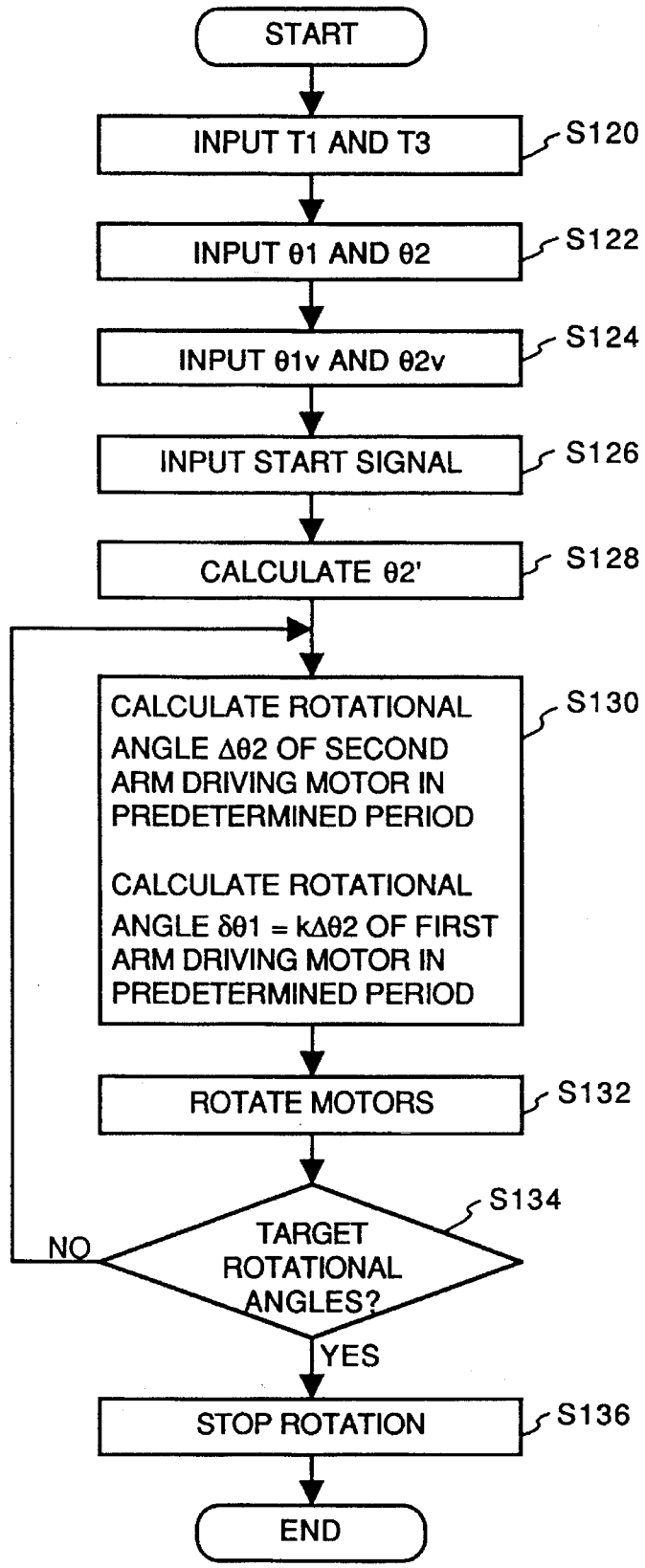
FIG. 33 is a flowchart showing an operation for straightforward motion of the hand.

Next, actual rotational operations of the first arm 204 and the second arm 205 will be described with reference to a flowchart of FIG. 33.

It should be noted that before an operator starts the robot 200 in accordance with the flowchart, the operator has calculated, from coordinates in an object position of the hand 280, the rotational angles θ1 and θ2, the acceleration time period T1 and the deceleration time period T3, the maximum rotational angular velocity θ1vm of the first arm 204 and the maximum rotational angular velocity θ2vm of the second arm 205, and the conveying time T2 at these maximum rotational angular velocities. After this preparatory operation, the operator starts the operation of the flowchart.

First, in step S120, the operator inputs from the console 306 setting values of the acceleration time T1 and the deceleration time T3 in FIG. 29. These values are stored in the memory 304. In step S122, the operator inputs from the console 306 the rotational angle θ1 of the first arm 204 and the rotational angle θ2 of the second arm 205. Also these values are stored in the memory 304. Similarly, in step S124, the operator inputs from the console 306 the maximum rotational angular velocity θ1vm of the first arm 204 and the maximum rotational angular velocity θ2vm of the second arm 205. These values are stored in the memory 304. When these input operations are completed, the robot 200 is in a standby status for moving the hand 280.

Next, in step S126, as the operator inputs a start signal from the console 306, in step S128, the CPU 302 calculates a target rotational angle θ2' of the second arm driving motor 221. In step S130, the CPU 302 calculates a rotational angle Δθ2 in a predetermined period of time ΔT (e.g., 5 msec), at the same time, calculates a rotational angle Δθ1 (=kΔθ2) of the first arm driving motor 206 in a predetermined period of time by increasing the rotational angle Δθ2 of the second arm driving motor 221 by k times. Here k represents the ratio of the rotational angle of the first arm driving motor 206 to that of the second arm driving motor 221. In this embodiment, if the reduction ratio of the second reduction unit 223 is set as ½ of the reduction ratio of the first reduction unit 211 in order to rotate the first arm driving motor 206 and the second arm driving motor 221 at the same rotational angular velocities, the hand 280 is linearly moved. Accordingly, in this case, k=1. Note that it is not necessary to set the reduction ratio of the second reduction unit 223 as ½ of the reduction ratio of the first reduction unit 211. The value of k can be changed in accordance with the reduction ratios of these reduction units. For example, in case the reduction ratio of the first reduction unit 211 and that of the second reduction unit 223 are the same, it is determined that k=½.

In step S132, the CPU 302 calculates accelerations for rotating the first arm driving motor 206 and the second arm driving motor 221 by Δθ1 and Δθ2 respectively within a predetermined period of time, and rotates the first arm driving motor 206 and the second arm driving motor 221 at the calculated accelerations, while the CPU 302 detects rotational angles in every predetermined period ΔT using the first and second rotary encoders 207 and 222. In step S134, it is determined whether the first arm driving motor 206 and the second arm driving motor 221 are rotated to the object rotational positions. If NO, steps S130 and 132 are repeated. If it is determined that the rotational angles of the first arm driving motor 206 and the second arm driving motor 221 have reached θ1' and θ2' respectively, the flow advances to step S136, where the respective motors are stopped and the control operation is terminated.

When the rotational motion as shown in FIGS. 26A and 26B is required, the operator inputs a command for the rotational motion from the console 306. The CPU 302 stores the command in the memory 304, at the same time, issues a command to the first control circuit 312 to rotate the first arm driving motor 206 a predetermined number of times at a predetermined rotational velocity to rotate the hand 280 to a desired rotational position.

In this embodiment, the robot 200 is described as a clean robot for conveying wafers and reticles, however, the robot 200 is not limited to the clean robot, it can be used as a general industrial robot.

Further, the robot 200 of this embodiment can be applied to a system constituted by a plurality of apparatus or to a single apparatus. Further, it goes without saying that the invention is applicable also to a case where a program for implementing the invention is supplied to a system or an apparatus.

In the clean robot of this embodiment, by making an opening hole in a second hollow member, a magnetic fluid seal can be supplied through this hole between a rotating shaft and a first hollow member after assembling and adjusting of robot. Accordingly, a clean robot which can be assembled without wasting a magnetic fluid seal or lowering its sealing capability and which needs no additional assembling and adjustment process can be provided. Further, as the opening hole is sealed after the magnetic fluid seal is supplied, the tight-sealed status of the second hollow member can be secured.

In the robot of this embodiment, as a sensor attaching member has a function for holding the sensor and a function for sealing a gap between the connector and the opening hole, a sealing member for the attaching portion is not required. Accordingly, the number of parts about the attaching portion can be reduced.

Similarly to the first embodiment, the robot comprises first to third driving means for driving the first to third arms. These driving means rotate the respective arms with a simple velocity ratios such as the same or doubled angular velocities. Thus a clean robot which has a simple mechanism and which can be controlled by simple operations can be provided.

In the aforementioned embodiments, the operator inputs the various data, e.g., T1, T2, θ1, θ2 etc. A variation of the invention can be proposed in that T, T3, θ1v, θ2v are previously stored in a memory, target angles θ1 and θ2 are input manually at programatically, and the controller 300 calculates optimal T1, T3, θ1v and θ2v on the basis of the input θ1 and θ2. This variation provides a robot which enables sequential rotating operations.

The present invention is not limited to the above embodiments and various changes and modifications can be made within the spirit and scope of the present invention. Therefore, to apprise the public of the scope of the present invention, the following claims are made.

What is claimed is:

1. A robot comprising:

a base;

a first arm rotatably supported-by said base;

first driving means for rotating said first arm around said base, said first driving means having a first motor arranged in said base and first transmission means fixed to said first arm for transmitting rotation of said first motor to said first arm;

a second arm rotatably supported by said first arm at an end portion of said first arm, said second arm having the same length as that of said first arm;

second driving means for rotating said second arm around said end portion of said first arm, said second driving means having a second motor arranged in said base and second transmission means for transmitting rotation of said second motor to said second arm;

a third arm rotatably supported by said second arm at an end portion of said second arm;

third driving means for rotating said third arm around said end portion of said second arm, said third driving means having a third transmission means for transmitting rotation of a shaft, which extends between said first and second arms and comprises part of said second driving means, to said third arm;

operating means arranged at said third arm for handling a workpiece; and control means for moving said operating means linearly, said control means controlling said first, second and third driving means so that a first arm rotation angle $\theta_1$, a second arm rotation angle $\theta_2$ and a third arm rotation angle $\theta_3$ satisfy the following condition:

$$\theta_2 = 180° - 2\theta_1$$

$$\theta_3 = \theta_2/2$$

where $\theta_1 = -60°$ to $60°$ $\theta_2 = 300°$ to $60°$ $\theta_3 = 150°$ to $30°$.

2. The robot according to claim 1, wherein said first arm has a first arm main body, a rotating shaft rotatably supported by said base and inserted in said first arm main body, a cover member for sealing an opening in said first arm main body and a magnetic fluid seal for sealing a space around said rotating shaft.

3. The robot according to claim 1, wherein said first transmission means includes first reduction means for reducing rotation of said first motor and said second transmission means includes second reduction means for reducing rotation of said second motor, and wherein a reduction ratio of said first reduction means is double that of second reduction means, and said control means controls so as to rotate said first motor and said second motor in opposite directions to each other at the same speed.

* * * * *

UNITED STATES PATENT AND TRADEMARK OFFICE
CERTIFICATE OF CORRECTION

PATENT NO. : 5,513,946
DATED : May 7, 1996
INVENTOR(S) : Sawada et al.

It is certified that error appears in the above-indentified patent and that said Letters Patent is hereby corrected as shown below:

Title page, item
[56] REFERENCES CITED:

```
FOREIGN PATENT DOCUMENTS
   "1140738    6/1989    Japan
    283182    3/1990    Japan
    282550    3/1990    Japan
    347834   10/1991    Japan" should read --1-140738   6/1989    Japan
    2-83182    3/1990    Japan
    2-82550    3/1990    Japan
    3-47834   10/1991    Japan--.
```

Signed and Sealed this

Twenty-second Day of October, 1996

Attest:

BRUCE LEHMAN

*Attesting Officer*    *Commissioner of Patents and Trademarks*